(12) United States Patent
Shaffer

(10) Patent No.: US 9,245,368 B2
(45) Date of Patent: Jan. 26, 2016

(54) DEVICE AND METHOD FOR DYNAMICALLY RENDERING AN ANIMATION

(75) Inventor: Joshua H. Shaffer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 539 days.

(21) Appl. No.: 13/247,969

(22) Filed: Sep. 28, 2011

(65) Prior Publication Data

US 2012/0306891 A1 Dec. 6, 2012

Related U.S. Application Data

(60) Provisional application No. 61/493,493, filed on Jun. 5, 2011.

(51) Int. Cl.
*G06T 13/00* (2011.01)

(52) U.S. Cl.
CPC .................................... *G06T 13/00* (2013.01)

(58) Field of Classification Search
CPC ......... G06T 13/00; G06T 13/40; G06T 13/80; G06T 13/20; G06T 15/04; G06T 15/20; G06T 17/00; G06T 19/00; G06T 1/20; G06T 2219/004
See application file for complete search history.

(56) References Cited

U.S. PATENT DOCUMENTS

| | | | | |
|---|---|---|---|---|
| 2007/0260984 | A1* | 11/2007 | Marks et al. | 715/706 |
| 2009/0128567 | A1* | 5/2009 | Shuster et al. | 345/473 |
| 2013/0080927 | A1* | 3/2013 | Weaver et al. | 715/758 |

OTHER PUBLICATIONS

Catto, E., "Box2D v2 1.0 User Manual," © 2007-2010, downloaded May 4, 2011, http://box2d.org/manual.html, 56 pages.
Coumans, E., "Bullet 2.76 Physics SDK Manual," © 2010, http://bulletphysics.org, 48 pages.
Office Action dated Sep. 25, 2013, received in U.S. Appl. No. 13/247,965, 11 pages (Shaffer).
Final Office Action received for U.S. Appl. No. 13/247,965, mailed on Apr. 10, 2014, 12 pages.
Feronato, Emanuele, "Box2D: Tutorial for the Absolute Beginners", available at<http://web.archive.org/web/20101208032155/http://www.emanueleferonato.com/2009/01/27/box2d-tutorial-for-the-absolute-beginners/>, Jan. 27, 2009, 18 pages.

* cited by examiner

*Primary Examiner* — Maurice L McDowell, Jr.
*Assistant Examiner* — Raffi Isanians
(74) *Attorney, Agent, or Firm* — Morrison & Foerster LLP

(57) ABSTRACT

A device includes one or more processors, and memory storing programs. The programs include a respective application and an application service module. The application service module includes instructions for, in response to a triggering event from the respective application, initializing an animation object with one or more respective initialization values corresponding to the triggering event. The animation object includes an instance of a predefined animation software class. At each of a series of successive times, the device updates the animation object so as to produce a respective animation value in accordance with a predefined animation function based on a primary function of an initial velocity and a deceleration rate and one or more secondary functions. The device updates a state of one or more user interface objects in accordance with the respective animation value, and renders on a display a user interface in accordance with the updated state.

25 Claims, 16 Drawing Sheets

500

502 In response to receiving a triggering event from a respective application of one or more applications, initialize an animation object with one or more respective initialization values corresponding to the triggering event. The animation object comprises an instance of a predefined animation software class.

At each of a series of successive times:

504 Update the animation object so as to produce a respective animation value in accordance with a predefined animation function

506 Render on a display a user interface including one or more user interface objects in accordance with the respective animation value from the animation object

508 The user interface comprises a user interface of the respective application

510 Rendering the user interface includes rendering an animation of the one or more user interface objects in accordance with the respective animation value

512 Render the user interface without providing the respective animation value to the respective application

514 Provide the respective animation value from the animation object to the respective application, which updates a user interface of the respective application in accordance with the respective animation value from the animation object

516 The respective application is not configured to receive the respective animation value

518 The respective application includes instructions for receiving the respective animation value from the animation object, and for updating a state of the one or more user interface objects

602 In response to a triggering event, initialize an animation object with one or more respective initialization values corresponding to the triggering event. The animation object comprises an instance of a predefined animation software class.

604 The electronic device includes a touch-sensitive surface. The triggering event includes an event corresponding to a lift-off of at least one user-touch off the touch-sensitive surface.

At each of a series of successive times:

606 Update the animation object so as to produce a respective animation value in accordance with a predefined animation function. The predefined animation function comprises a combination of a primary function of an initial velocity and a deceleration rate and one or more secondary functions.

608 Each secondary function is applicable when the respective animation value falls within a respective corresponding range

610 A respective secondary function corresponds to one of: a soft stop function, a hard stop function, a rebound function, a pull proportional function, and a magnet function

612 The animation function comprises a combination of the primary function and two or more secondary functions. Each secondary function corresponds to a distinct one of: a soft stop function, a rebound function, a pull proportional function, and a magnet function.

614 The respective animation value produced by the animation object is a one-dimensional scalar value

616 Update a state of one or more user interface objects. Each updated user interface object is updated in accordance with the respective animation value from the animation object.

Figure 6A

DEVICE AND METHOD FOR DYNAMICALLY RENDERING AN ANIMATION

RELATED APPLICATION

This application claims priority to U.S. Provisional Application Ser. No. 61/493,493, filed Jun. 5, 2011, entitled "Device and Method for Dynamically Rendering an Animation," which is incorporated by reference herein in its entirety.

TECHNICAL FIELD

This relates generally to electronic devices with displays, including but not limited to electronic devices that are configured to dynamically render animations.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on displays. For example, many software applications are designed to move user interface objects in response to touch inputs.

But in developing software applications, existing methods for handling animations of user interface objects in response touch inputs are cumbersome and inefficient. For example, coding a set of instructions to handle animations of user interface objects in response to touch inputs (e.g., moving user interface objects in response to the touch inputs) may take longer than necessary. In addition, adding the set of instructions to every application configured to handle inputs on touch-sensitive surfaces may require memory larger than necessary.

SUMMARY

Accordingly, there is a need for electronic devices with faster and more efficient methods for rendering an animation of one or more user interface objects in accordance with inputs on touch-sensitive surfaces. Such methods and devices may complement or replace conventional methods and devices for rendering animations of user interface objects.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, an electronic device includes a display, one or more processors, and memory storing one or more programs for execution by the one or more processors. The one or more programs include one or more applications and an application service module. The application service module includes instructions for, in response to receiving a triggering event from a respective application of the one or more applications, initializing an animation object with one or more respective initialization values corresponding to the triggering event. The animation object includes an instance of a predefined animation software class. The application service module includes instructions for, at each of a series of successive times: updating the animation object so as to produce a respective animation value in accordance with a predefined animation function; and rendering on the display a user interface including one or more user interface objects in accordance with the respective animation value from the animation object.

In accordance with some embodiments, a non-transitory computer readable storage medium stores one or more programs for execution by one or more processors of an electronic device with a display. The one or more programs include one or more applications and an application service module. The application service module includes instructions for, in response to receiving a triggering event from a respective application of the one or more applications, initializing an animation object with one or more respective initialization values corresponding to the triggering event. The animation object includes an instance of a predefined animation software class. The one or more programs include instructions for, at each of a series of successive times: updating the animation object so as to produce a respective animation value in accordance with a predefined animation function; and rendering on the display a user interface including one or more user interface objects in accordance with the respective animation value from the animation object.

In accordance with some embodiments, a method is performed at an electronic device with a display, memory storing one or more programs including one or more applications and an application service module, and one or more processors for executing at least a subset of the one or more programs. The method includes, in response to receiving a triggering event from a respective application of the one or more applications, initializing an animation object with one or more respective initialization values corresponding to the triggering event, at the application service module of the electronic device. The animation object includes an instance of a predefined animation software class. The method also includes, at each of a series of successive times: updating the animation object so as to produce a respective animation value in accordance with a predefined animation function; and rendering on the display a user interface including one or more user interface objects in accordance with the respective animation value from the animation object.

In accordance with some embodiments, an electronic device includes a display unit, a processing unit coupled to the display unit, and an application service module unit coupled to the display unit and the processing unit. The application service module unit is configured to, in response to receiving a triggering event from a respective application, initialize an animation object with one or more respective initialization values corresponding to the triggering event. The animation object includes an instance of a predefined animation software class. The application service module unit is also configured to, at each of a series of successive times: update the animation object so as to produce a respective animation value in accordance with a predefined animation function, and render on the display unit a user interface including one or more user interface objects in accordance with the respective animation value from the animation object.

In accordance with some embodiments, an electronic device includes a display; one or more processors; and memory storing one or more programs for execution by the one or more processors. The one or more programs include one or more applications and an application service module. The application service module includes one or more instructions for, in response to receiving a triggering event from a respective application of the one or more applications, initializing one or more animation objects, each animation object with one or more respective initialization values corresponding to the triggering event. Each animation object includes an instance of a predefined animation software class. The application service module further includes one or more instructions for, at each of a series of successive times: updating each animation object so as to produce a respective animation value in accordance with a predefined animation function; and rendering on the display a user interface including one or more user interface objects in accordance with the respective animation value from at least one of the one or more animation objects.

In accordance with some embodiments, an electronic device includes a display; an application service module; one or more processors; and memory storing one or more programs for execution by the one or more processors. The one or more programs include one or more applications. The application service module is configured to, in response to receiving a triggering event from a respective application of the one or more applications, initialize an animation object with one or more respective initialization values corresponding to the triggering event. The application service module is further configured to, at each of a series of successive times: update the animation object so as to produce a respective animation value in accordance with a predefined animation function; and render on the display a user interface including one or more user interface objects in accordance with the respective animation value from the animation object.

In accordance with some embodiments, an application service module (e.g., in a graphics processing unit or chipset) for use with an electronic device includes one or more semiconductor devices (e.g., transistors); and one or more electrical interfaces. The application service module is configured to receive a triggering event through the one or more electrical interfaces. The triggering event is from a respective application stored in memory of the electronic device. The application service module is configured to, in response to receiving the triggering event, initialize an animation object with one or more respective initialization values corresponding to the triggering event. The application service module is configured to, at each of a series of successive times: update the animation object so as to produce a respective animation value in accordance with a predefined animation function using the one or more semiconductor devices; and render on a display of the electronic device a user interface including one or more user interface objects in accordance with the respective animation value from the animation object.

In accordance with some embodiments, a non-transitory computer readable storage medium stores one or more programs for execution by one or more processors of an electronic device with a display and an application service module. The one or more programs include instructions for providing a triggering event to the application service module. The application service module is configured to respond to the triggering event by initializing an animation object with one or more respective initialization values corresponding to the triggering event. The application service module is configured to, at each of a series of successive times: update the animation object so as to produce a respective animation value in accordance with a predefined animation function; and render on the display a user interface including one or more user interface objects in accordance with the respective animation value from the animation object.

In accordance with some embodiments, a non-transitory computer readable storage medium stores one or more programs for execution by one or more processors of an electronic device with a display. The one or more programs include one or more applications and an application service module. The one or more applications include instructions for providing a triggering event to the application service module. The application service module is configured to respond to the triggering event by initializing an animation object with one or more respective initialization values corresponding to the triggering event. The animation object includes an instance of a predefined animation software class. The application service module is further configured to, at each of a series of successive times: update the animation object so as to produce a respective animation value in accordance with a predefined animation function; and render on the display a user interface including one or more user interface objects in accordance with the respective animation value from the animation object.

In accordance with some embodiments, a method is performed by an electronic device having a display, one or more processors and memory storing one or more programs for execution by the one or more processors. The method includes, in response to a triggering event, initializing an animation object with one or more respective initialization values corresponding to the triggering event. The animation object includes an instance of a predefined animation software class. The method also includes, at each of a series of successive times: updating the animation object so as to produce a respective animation value in accordance with a predefined animation function. The predefined animation function includes a combination of a primary function of an initial velocity and a deceleration rate and one or more secondary functions. The method further includes updating a state of one or more user interface objects, where each updated user interface object is updated in accordance with the respective animation value from the animation object. The method includes rendering on the display a user interface in accordance with the updated state of the one or more user interface objects.

In accordance with some embodiments, an electronic device includes one or more processors, and memory storing one or more programs for execution by the one or more processors. The one or more programs include instructions for, in response to a triggering event, initializing an animation object with one or more respective initialization values corresponding to the triggering event. The animation object includes an instance of a predefined animation software class. The one or more programs include instructions for, at each of a series of successive times: updating the animation object so as to produce a respective animation value in accordance with a predefined animation function. The predefined animation function includes a combination of a primary function of an initial velocity and a deceleration rate and one or more secondary functions. The one or more programs also include instructions for updating a state of one or more user interface objects, where each updated user interface object is updated in accordance with the respective animation value from the animation object. The one or more programs further include instructions for rendering on the display a user interface in accordance with the updated state of the one or more user interface objects.

In accordance with some embodiments, a non-transitory computer readable storage medium stores one or more programs for execution by one or more processors of an electronic device. The one or more programs include instructions for, in response to a triggering event, initializing an animation object with one or more respective initialization values corresponding to the triggering event. The animation object includes an instance of a predefined animation software class. The one or more programs include instructions for, at each of a series of successive times: updating the animation object so as to produce a respective animation value in accordance with a predefined animation function. The predefined animation function includes a combination of a primary function of an initial velocity and a deceleration rate and one or more secondary functions. The one or more programs also include instructions for updating a state of one or more user interface objects, where each updated user interface object is updated in accordance with the respective animation value from the animation object. The one or more programs further include instructions for rendering on the display a user interface in accordance with the updated state of the one or more user interface objects.

In accordance with some embodiments, an electronic device includes a display unit and a processing unit coupled to the display unit. The processing unit is configured to, in response to a triggering event, initialize an animation object with one or more respective initialization values corresponding to the triggering event. The animation object includes an instance of a predefined animation software class. The processing unit is also configured to, at each of a series of successive times, update the animation object so as to produce a respective animation value in accordance with a predefined animation function, update a state of one or more user interface objects, and render on the display unit a user interface in accordance with the updated state of the one or more user interface objects. The predefined animation function includes a combination of a primary function of an initial velocity and a deceleration rate and one or more secondary functions. Each updated user interface object is updated in accordance with the respective animation value from the animation object.

In accordance with some embodiments, an electronic device includes a display and means for performing any of the methods described above.

In accordance with some embodiments, an information processing apparatus for use in an electronic device with a display includes means for performing any of the methods described above.

Thus, electronic devices with are provided with faster, more efficient methods for handling inputs on touch-sensitive surfaces, thereby increasing the effectiveness, efficiency, and user satisfaction with such devices. Such methods may complement or replace conventional methods for handling inputs on touch-sensitive surfaces.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 5 is a flow diagram illustrating a method of rendering a user interface with an application service module in accordance with some embodiments.

FIGS. 6A-6B are flow diagrams illustrating a method of rendering a user interface based on a state of user interface objects in accordance with some embodiments.

DESCRIPTION OF EMBODIMENTS

Many electronic devices have graphical user interfaces that respond to touch inputs. Various operations of such devices require receiving touch inputs, and rendering the graphical user interfaces in accordance with the received touch inputs, for example by performing an animation of a user interface object in response to a received touch input. However, implementing separate instructions for handling respective touch inputs can be inefficient and time-consuming. In the embodiments described below, an improved method for handling touch inputs is achieved by implementing a common set of instructions for handling predefined touch inputs separately from various applications. By handling the predefined touch inputs separately, applications need not include instructions for handling the predefined touch inputs. As a result, the applications are easier to develop, more compact to store, and more efficient to execute. With electronic devices with multiple processors (or multi-threaded or multi-core processors), handling the predefined touch inputs separately from the applications may better utilize the multiple processors, thereby improving the speed and efficiency of such electronic devices.

Figure 6B:
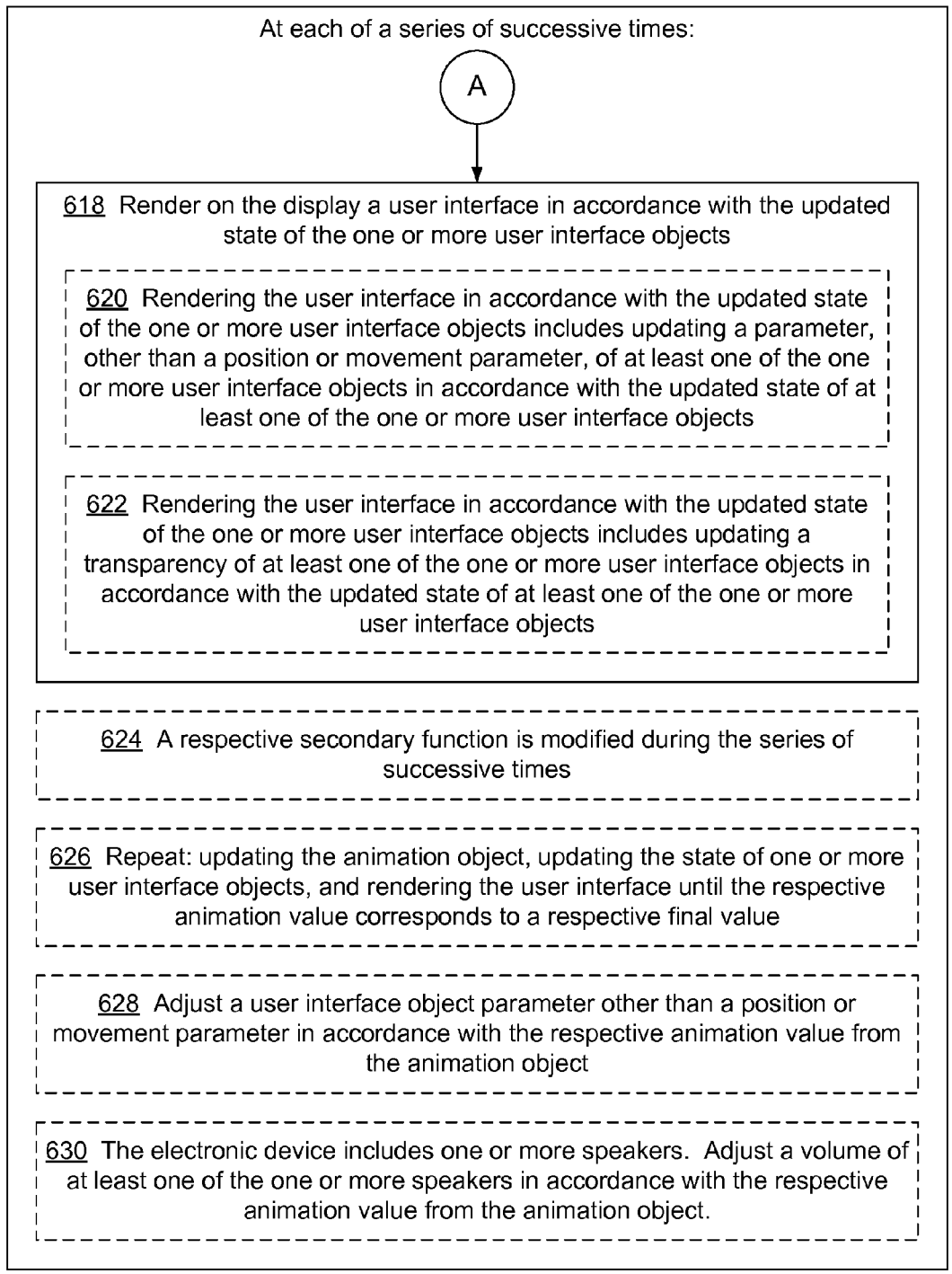

Below, FIGS. 1A-1B, 2, and 3 provide a description of exemplary devices. FIGS. 4A-4G illustrate exemplary user interfaces that include dynamically rendered animation. FIG. 5 is a flow diagram illustrating a method of rendering a user interface with an application service module. FIGS. 6A-6B are flow diagrams illustrating a method of rendering a user interface in accordance with a state of user interface objects. The user interfaces in FIGS. 4A-4G are used to illustrate the processes illustrated by the flow diagrams in FIGS. 5 and 6A-6B.

Exemplary Devices

Reference will now be made in detail to embodiments, examples of which are illustrated in the accompanying drawings. In the following detailed description, numerous specific details are set forth in order to provide a thorough understanding of the embodiments. However, it will be apparent to one of ordinary skill in the art that other embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first location could be termed a second location, and, similarly, a second location could be termed a first location, without changing the meaning of the description, so long as all occurrences of the first location are renamed consistently and all occurrences of the second location are renamed consistently. The first location and the second location are both locations, but they are not the same location.

The terminology used in the description of the embodiments herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
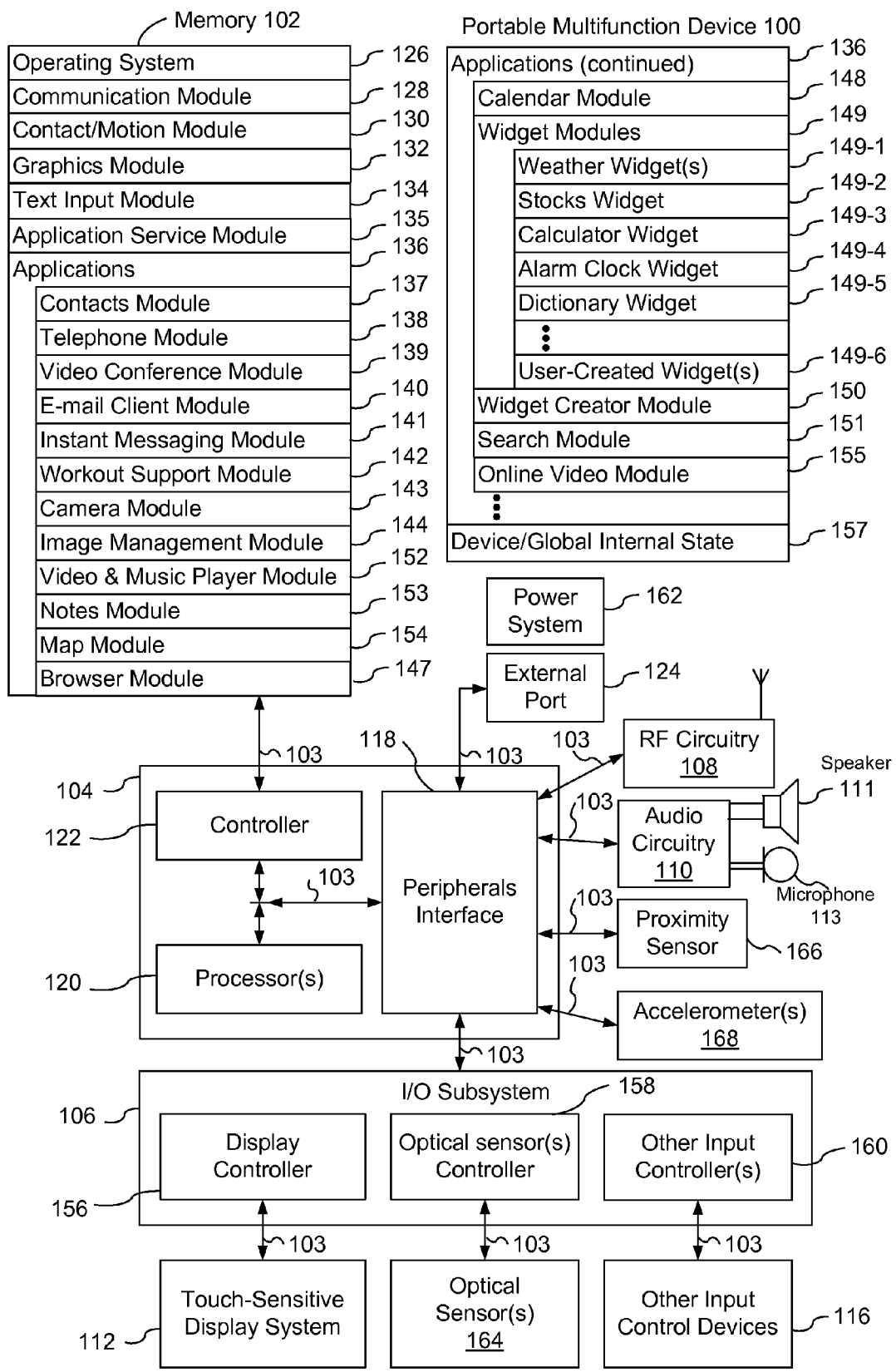
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more non-transitory computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
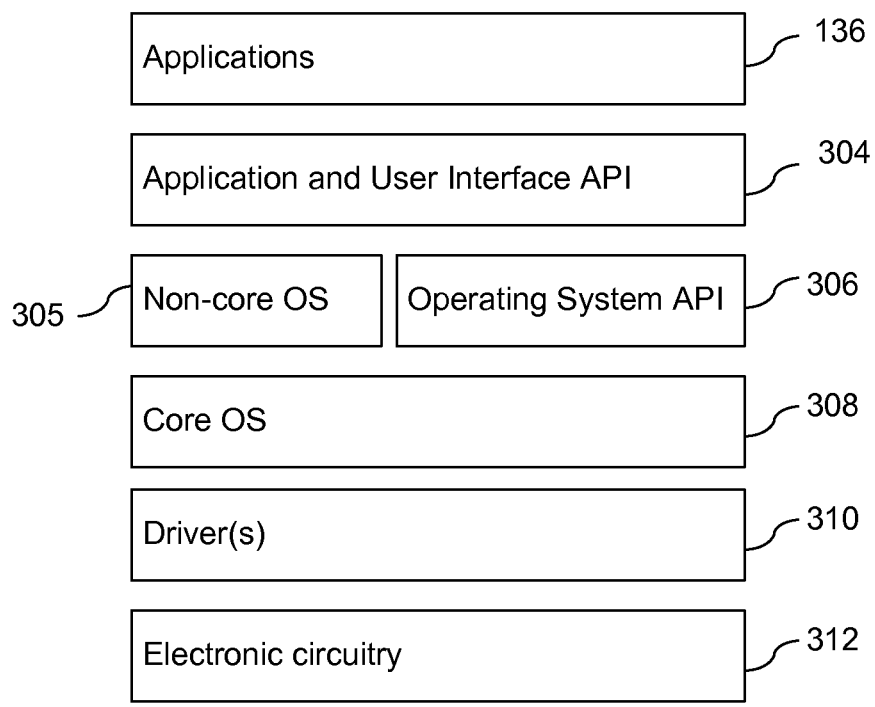
FIG. 3 is a block diagram illustrating an exemplary architecture of an electronic device in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, application service module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

Application service module 135, which may be a component of operating system 126 or graphics module 132, provides various services to one or more applications stored in memory 102 (e.g., contacts module 137, email client module 140, instant messaging module 141, image management module 144, notes module 153, browser module 147, calendar module 148, etc.). For example, application service module 135 is configured to provide a comprehensive framework for handling various events (e.g., touch events) so that each application does not need to handle events (e.g., touch inputs) that would be otherwise handled by respective applications in similar manners.

In implementations that include a GPS module, the GPS module (not shown) determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 may include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
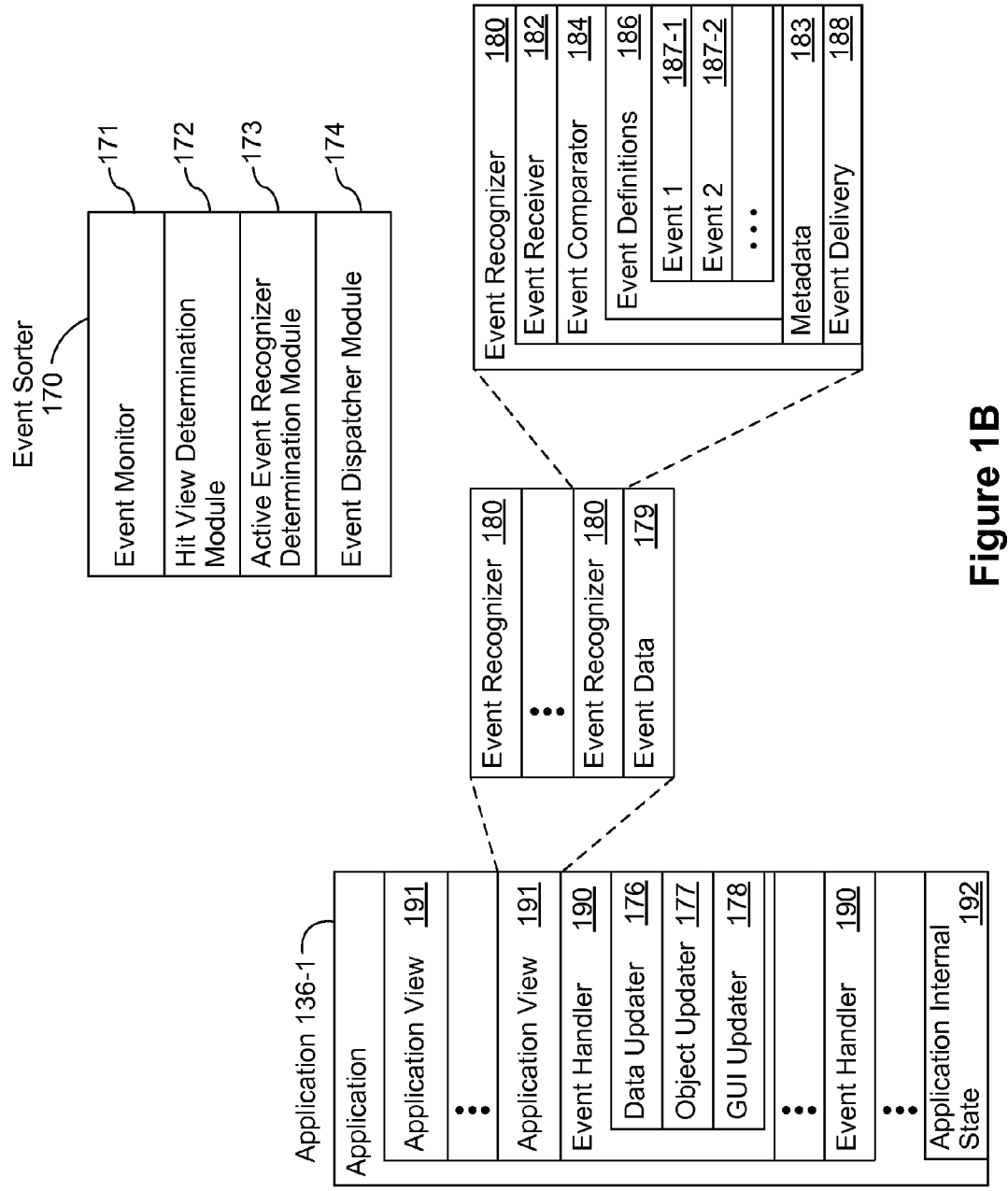
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 270 (FIG. 2) includes event sorter 170 (e.g., in operating system 126) and a respective application 136-1 (e.g., any of the aforementioned applications 137-151, 155, or any of applications 280-290).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
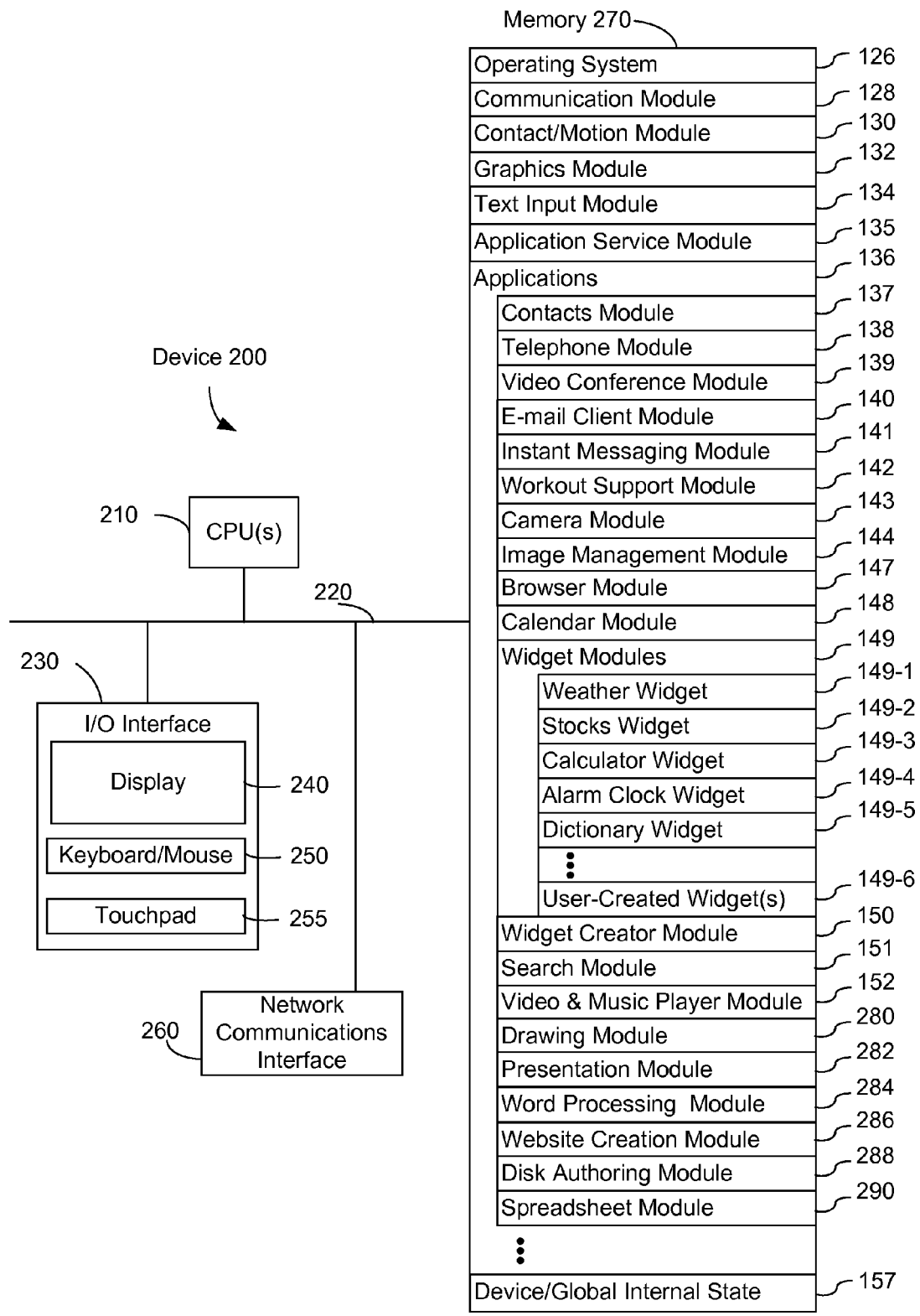
FIG. 2 is a block diagram of an exemplary electronic device with a display in accordance with some embodiments.

FIG. 2 is a block diagram of an exemplary multifunction device with a display and a touch-sensitive surface in accordance with some embodiments. Device 200 need not be portable. In some embodiments, device 200 is a laptop computer, a desktop computer, a tablet computer, a multimedia player device, a navigation device, an educational device (such as a child's learning toy), a gaming system, or a control device (e.g., a home or industrial controller). Device 200 typically includes one or more processing units (CPU's) 210, one or more network or other communications interfaces 260, memory 270, and one or more communication buses 220 for interconnecting these components. Communication buses 220 may include circuitry (sometimes called a chipset) that interconnects and controls communications between system components. Device 200 includes input/output (I/O) interface 230 that includes display 240, which is typically a touch screen display. I/O interface 230 also may include a keyboard and/or mouse (or other pointing device) 250 and touchpad 255. Memory 270 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 270 optionally includes one or more storage devices remotely located from CPU(s) 210. In some embodiments, memory 270 or a non-transitory computer readable storage medium of memory 270 stores programs, modules, and data structures analogous to the programs, modules, and data structures stored in memory 102 of portable multifunction device 100 (FIG. 1A), or a subset thereof. Furthermore, memory 270 or the non-transitory computer readable storage medium of memory 270 optionally stores additional programs, modules, and data structures not present in memory 102 of portable multifunction device 100. For example, memory 270 of device 200 may store drawing module 280, presentation module 282, word processing module 284, website creation module 286, disk authoring module 288, and/or spreadsheet module 290, while memory 102 of portable multifunction device 100 (FIG. 1A) may not store these modules.

Each of the above identified elements in FIG. 2 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 270 may store a subset of the modules and data structures identified above. Furthermore, memory 270 may store additional modules and data structures not described above.

FIG. 3 is a block diagram illustrating an exemplary architecture of an electronic device (e.g., device 100, FIG. 1A or device 200, FIG. 2) in accordance with some embodiments. The architecture shown in FIG. 3 includes a plurality of layers (136 and 304-312).

Electronic circuitry 312 of the device is at the base layer of the architecture. Electronic circuitry 312 includes various hardware components, such as the hardware components depicted in FIG. 1A (e.g., processor(s) 120). All the other layers (136 and 304-310) of the architecture may be implemented as hardware components, software procedures, or a combination thereof that process inputs received from electronic circuitry 312 and generate various outputs that are cascaded through the layers and ultimately presented through a physical user interface (e.g., one or more of a display, speakers, device vibration actuator, etc.).

A driver or a set of drivers 310 communicates with electronic circuitry 312. Drivers 310 are configured to receive and process input data received from electronic circuitry 312. Core Operating System ("core OS") 308 is configured to communicate with driver(s) 310. Core OS 308 is typically configured to process raw input data received from driver(s) 310. In some cases, drivers 310 are considered to be a part of core OS 308. The architecture also includes non-core OS 305 which includes various components of the operating system that are not included in any other layer.

A set of OS application programming interfaces ("OS APIs") 306 may be implemented as software procedures that communicate with core OS 308. In some embodiments, OS APIs 306 are included in the device's operating system, but at a level above core OS 308. OS APIs 306 are designed for use by applications running on the electronic devices or apparatuses discussed herein. Application and User interface (UI) APIs 304 may be configured to utilize OS APIs 306. When application software ("applications") 136 running on the device utilizes UI APIs 304 in order to present data or graphics to the user, UI APIs 304 may, in turn, communicate with lower level elements, ultimately communicating with various user interface devices, e.g., touch-sensitive display 112.

While each layer in the architecture may utilize the layer underneath it, that is not always required. For example, in some embodiments, one or more of applications 136 can occasionally communicate with OS APIs 306, core OS 308, and/or one or more driver(s) 310. However, layers at or above OS API layer 306 generally do not access core OS 308, driver(s) 310, or hardware 312 directly for system security and stability purposes. Instead, applications 136 and UI API 304 typically send calls to OS API 306, which in turn, accesses the layers core OS 308, driver(s) 310, and electronic circuitry 312.

Respective components and modules shown in FIGS. 1A and 2 may be implemented as part of one or more layers shown in FIG. 3. For example, speaker 111 (FIG. 1A) and touch-sensitive display system 112 are implemented as part of electronic circuitry 312. Contact/motion module 130 may be implemented as part of driver(s) 310 and/or core OS 308. Various components of operating system 126 may be implemented as part of core OS 308, non-core OS 305, OS API 306, UI API 304, and/or driver(s) 310. Application service module 135 may be implemented as part of electronic circuitry 312 (e.g., as part of a chipset or graphics processing unit), core OS 308, non-core OS, OS API 306, and/or UI API 304. However, application service module 135 is typically included in UI API 304.

User Interfaces and Associated Processes

Attention is now directed towards exemplary user interfaces ("UI") and associated processes that may be implemented on an electronic device with a display and a touch-sensitive surface, such as device 200 or portable multifunction device 100.

FIGS. 4A-4G illustrate exemplary user interfaces that include dynamically rendered animation in accordance with some embodiments. The user interfaces in these figures are used to illustrate the processes described below, including the processes depicted by the flow diagrams in FIGS. 5 and 6A-6B. The user interfaces in FIGS. 4A-4G may be rendered on a touch-sensitive display (e.g., 112, FIG. 1A) or a display (e.g., 240, FIG. 2) separate from a touch-sensitive surface. It should be noted that the user interfaces in FIGS. 4A-4G are not drawn to scale.

Figure 4A:
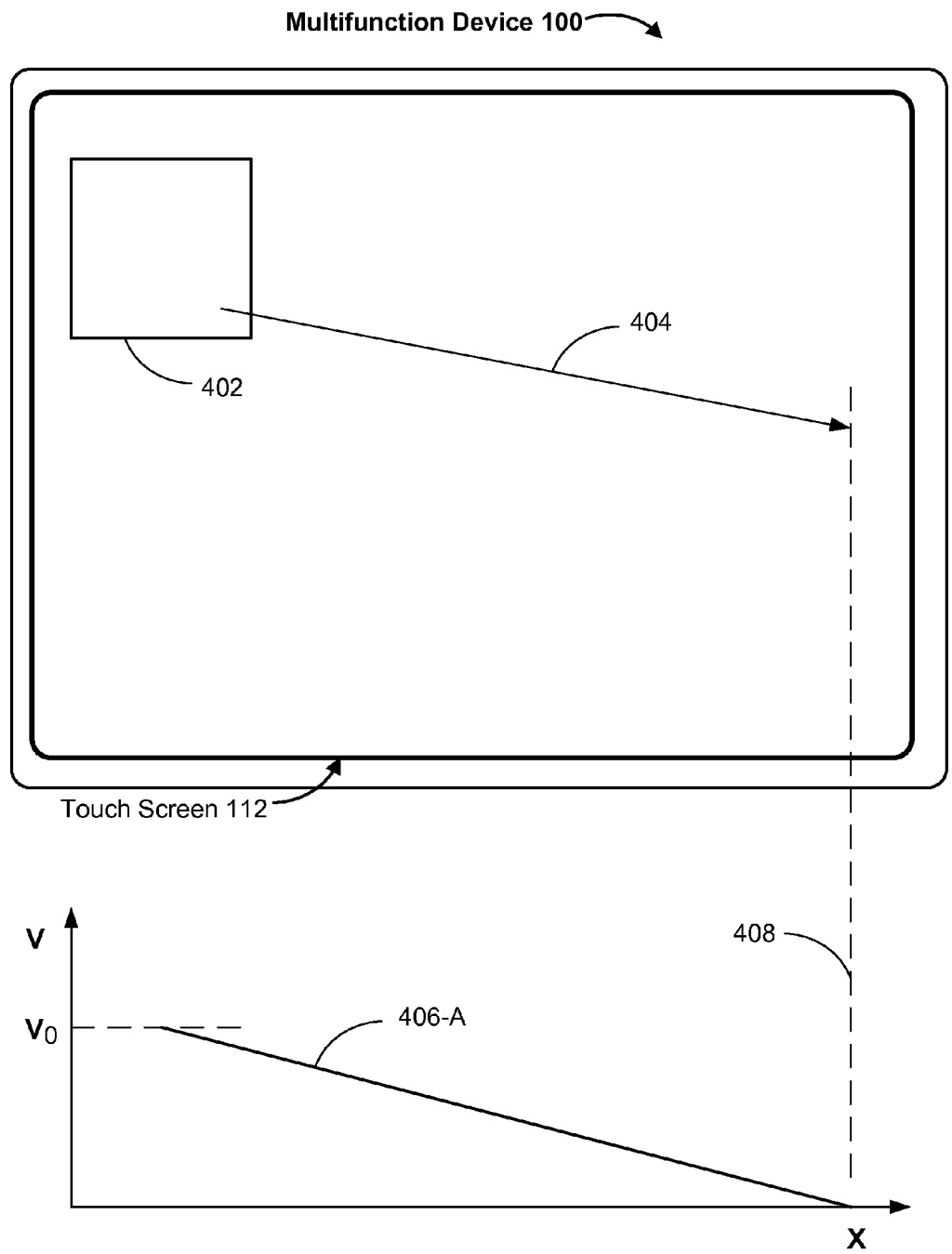
FIGS. 4A-4G illustrate exemplary user interfaces that include dynamically rendered animation in accordance with some embodiments.

FIG. 4A illustrates a user interface of multifunction device 100 that includes user interface object 402. Depicted below multifunction device 100 is velocity profile 406-A, which is illustrated as a function of distance x (corresponding to an animation value) between an original position and a respective position of user interface object 402. In some embodiments, the user interface displays an animation of user interface object 402 moving along path 404 in accordance with velocity profile 406-A. In the animation described in FIG. 4A, user interface object 402 starts to move at an initial velocity $v_0$, and decelerates at a deceleration rate until user interface object 402 stops movement when its velocity becomes zero (e.g., at a location that corresponds to line 408). As used herein with respect to a velocity profile, the term "simple" is characterized by a monotonic decrease in the velocity of a user interface object. In some embodiments, a simple function (or a simple velocity decrease function) that corresponds to a monotonic decrease in the velocity of a user interface object is used to implement velocity profile 406-A.

Figure 4B:
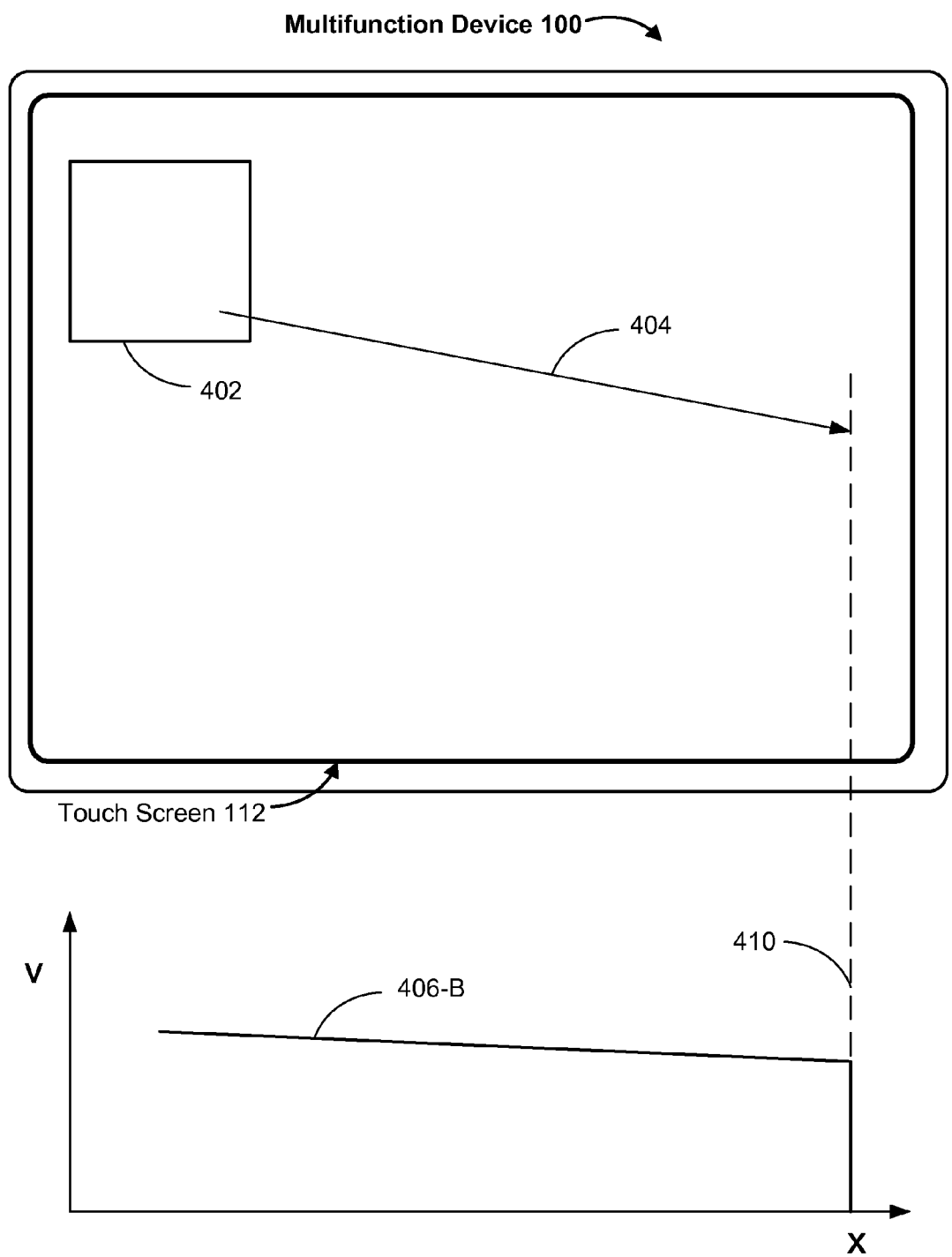

In FIG. 4B, the user interface of device 100 displays an animation of user interface object 402 moving along path 404 in accordance with velocity profile 406-B. In the animation, user interface object 402 starts to move at an initial velocity and decelerates at a predefined deceleration rate until the velocity of user interface object 402 immediately changes to zero (e.g., at a location on path 404 that corresponds to line 410). As used herein with respect to a velocity profile, the term "hard stop" is characterized by an immediate change of the velocity of the user interface object to zero. In some embodiments, a function (called a hard stop function) that sets the velocity of a user interface object to zero at a predefined location is used to implement at least a portion of velocity profile 406-B.

Figure 4C:
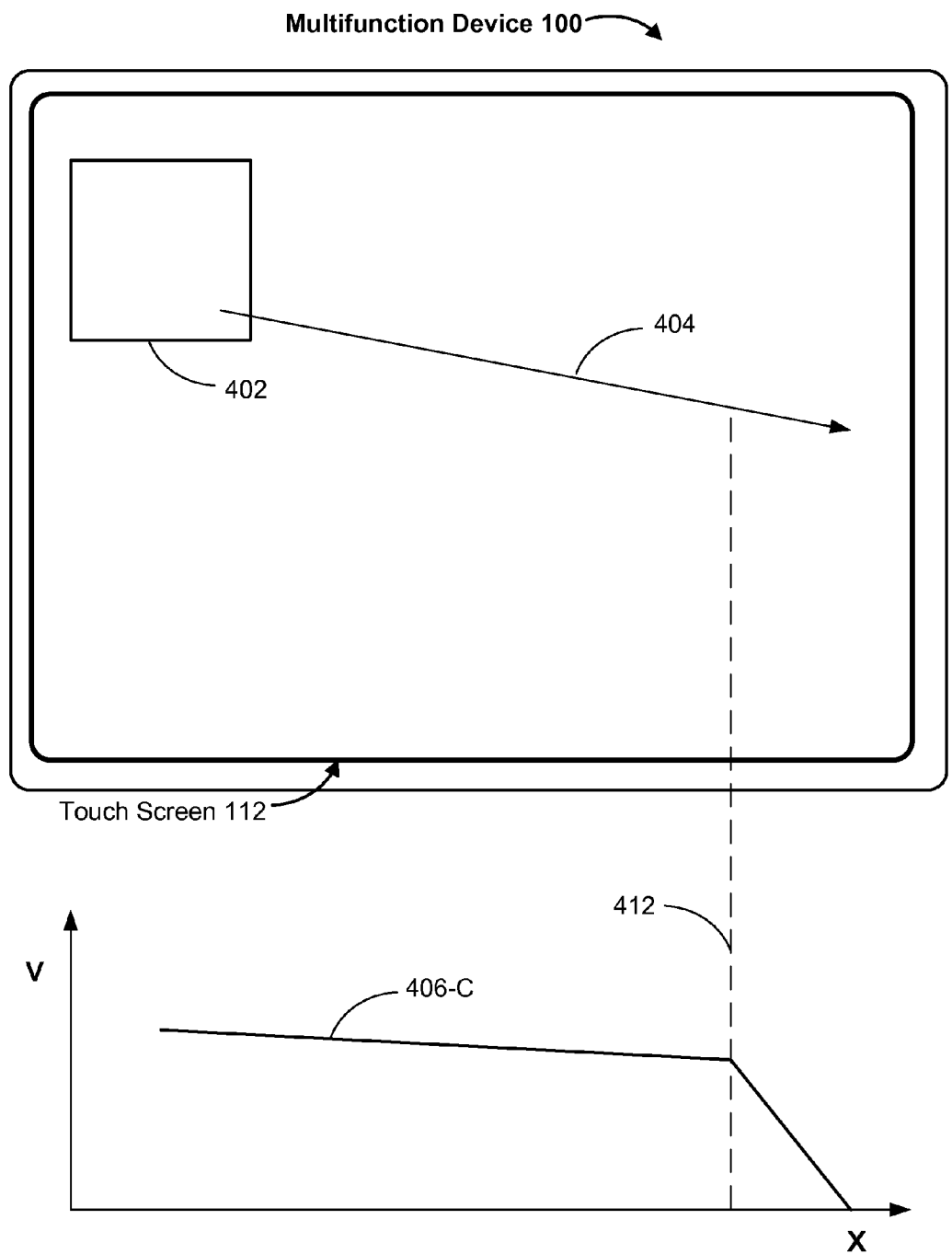

FIG. 4C illustrates a user interface that displays an animation of user interface object 402 moving along path 404 in accordance with velocity profile 406-C. In the animation, user interface object 402 starts to move at an initial velocity while decelerating at a first deceleration rate until the deceleration rate changes to a second deceleration rate. The second deceleration rate is distinct from the first deceleration rate. In FIG. 4C, the deceleration rate of user interface object 402 increases (i.e., user interface object 402 decelerates more rapidly) at a location on path 404 that corresponds to line 412, and user interface object 402 continues to move until its velocity reaches zero. As used herein with respect to a velocity profile, the term "soft stop" is characterized by a change of a deceleration rate of a user interface object (e.g., an increased deceleration rate). In some embodiments, a function (called a soft stop function) that changes the deceleration rate of a user interface object at a predefined location, or when the location of the user interface object falls within a specified range, is used to implement at least a portion of velocity profile 406-C.

Figure 4D:
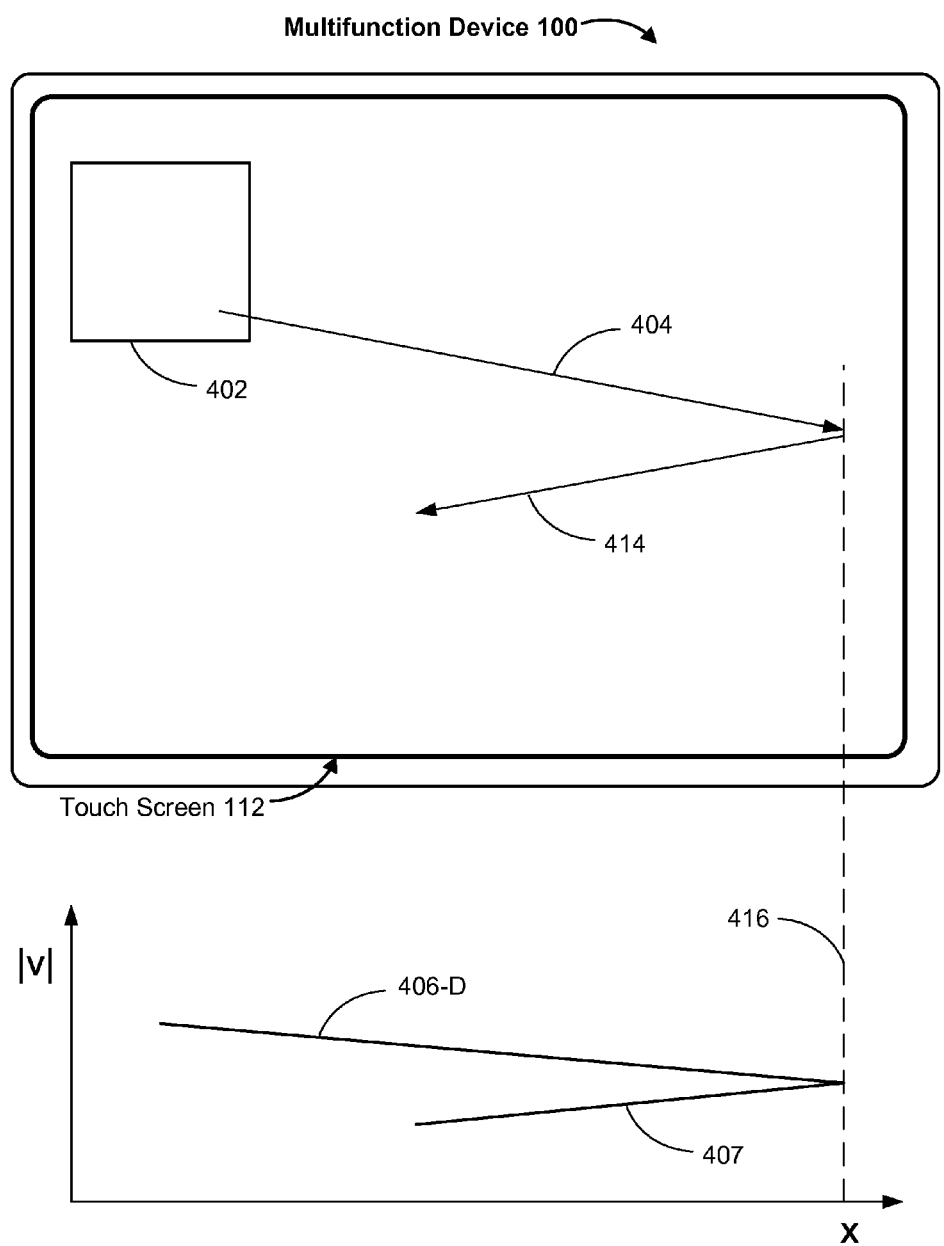

In FIG. 4D, the user interface of device 100 displays an animation of user interface object 402 moving along path 404 in accordance with velocity profile 406-D followed by moving along path 414 in accordance with velocity profile 407. When user interface object 402 reaches a location on path 404 that corresponds to line 416, at least one velocity component (e.g., a velocity component for a horizontal direction) of user interface object 402 reverses its direction. Absolute velocity values are used to illustrate velocity profiles 406-D and 407 in FIG. 4D. In some embodiments, a first velocity in profile 406-D and a second velocity in profile 407 have different plus/minus signs (e.g., the first velocity in profile 406 may be represented by a positive number, and the second velocity in profile 407 may be represented by a negative number). As used herein with respect to a velocity profile, the term "rebound" is characterized by a change of a direction of a user interface object (typically a reversal of at least one directional component of its movement, such as horizontal movement or vertical movement). In some embodiments, a function (called a rebound function) that changes the direction of a user interface object at a predefined location is used to implement velocity profiles 406-D and 407 associated with the change of direction from path 404 to path 414.

Figure 4E:
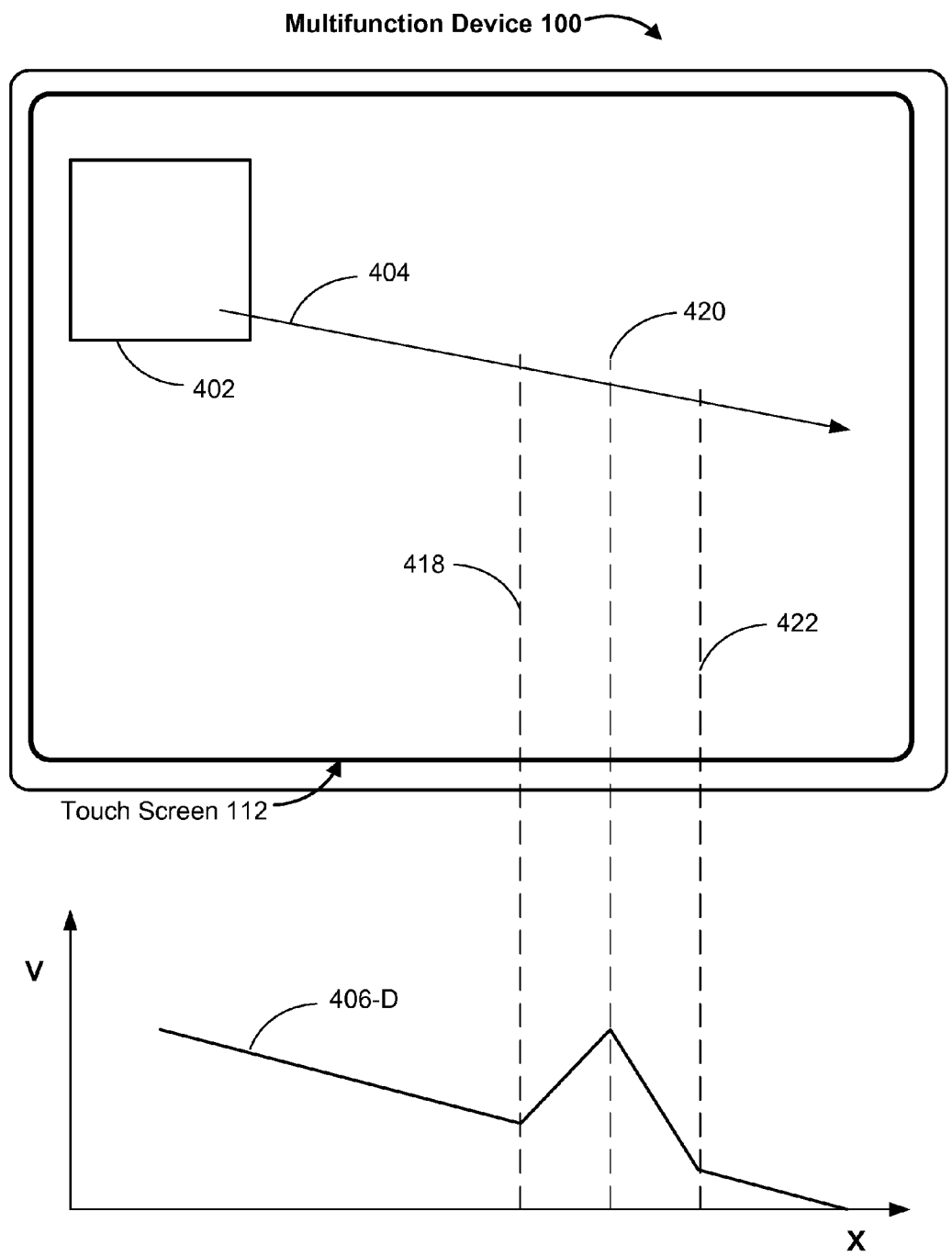

FIG. 4E illustrates a user interface that displays an animation of user interface object 402 moving along path 404 in accordance with velocity profile 406-D. In the animation, user interface object 402 starts to move at an initial velocity while decelerating at a first deceleration rate until user interface object 402 reaches a first location on path 404 corresponding to line 418. At the first location on path 404 corresponding to line 418, the deceleration rate of user interface object 402 changes to a second deceleration rate. The term "deceleration rate" is used herein to refer to a rate at which the velocity of a user interface object changes, regardless of whether the user interface object accelerates or decelerates (e.g., a deceleration rate may be represented by a negative number, which effectively indicates that the user interface object is accelerating). For example, the deceleration rate of user interface object 402 changes to the second deceleration rate at the first location on path 404 corresponding to line 418 so that the velocity of user interface object 402 increases (i.e., user interface object 402 accelerates) between the first location on path 404 corresponding to line 418 and a second location on path 404 corresponding to line 420. Between the second location on path 404 corresponding to line 420 and a third location on path 404 corresponding to line 422, the deceleration rate of user interface object 402 changes to a third deceleration rate and the velocity of user interface object 402 decreases (i.e., user interface object 402 decelerates). The second deceleration rate and the third deceleration typically have opposite plus/minus signs (e.g., when the user interface object accelerates with the second deceleration rate, the user interface object decelerates with the third deceleration rate, and vice versa). At the third location on path 404 corresponding to line 422, the deceleration rate of user interface object 402 changes either to the first deceleration rate or a fourth deceleration rate that is distinct from the first deceleration rate. These operations present an animation where user interface object 402 is perceived as attracted toward the location on path 404 corresponding to line 420. Alternatively, the user interface may display an animation where user interface object 402 is perceived as repelled from the location on path 404 corresponding to line 420 (e.g., user interface object 402 may decelerate between the first location on path 404 corresponding to line 418 and the second location on path 404 corresponding to line 420, and accelerate between the second location on path 404 corresponding to line 420 and the third location on path 404 corresponding to line 422). As used herein with respect to a velocity profile, the term "magnet" is characterized by the series of changes in the deceleration rate (including two deceleration rates of different plus/minus signs). In some embodiments, a function (called a magnet function) that changes the deceleration in accordance with a series of deceleration (and acceleration) rates is used to implement at least a portion of velocity profile 406-D. In some implementations, the magnet function is operative within a range of locations specified by the application in which the user interface objects form part of the user interface.

Figure 4F:
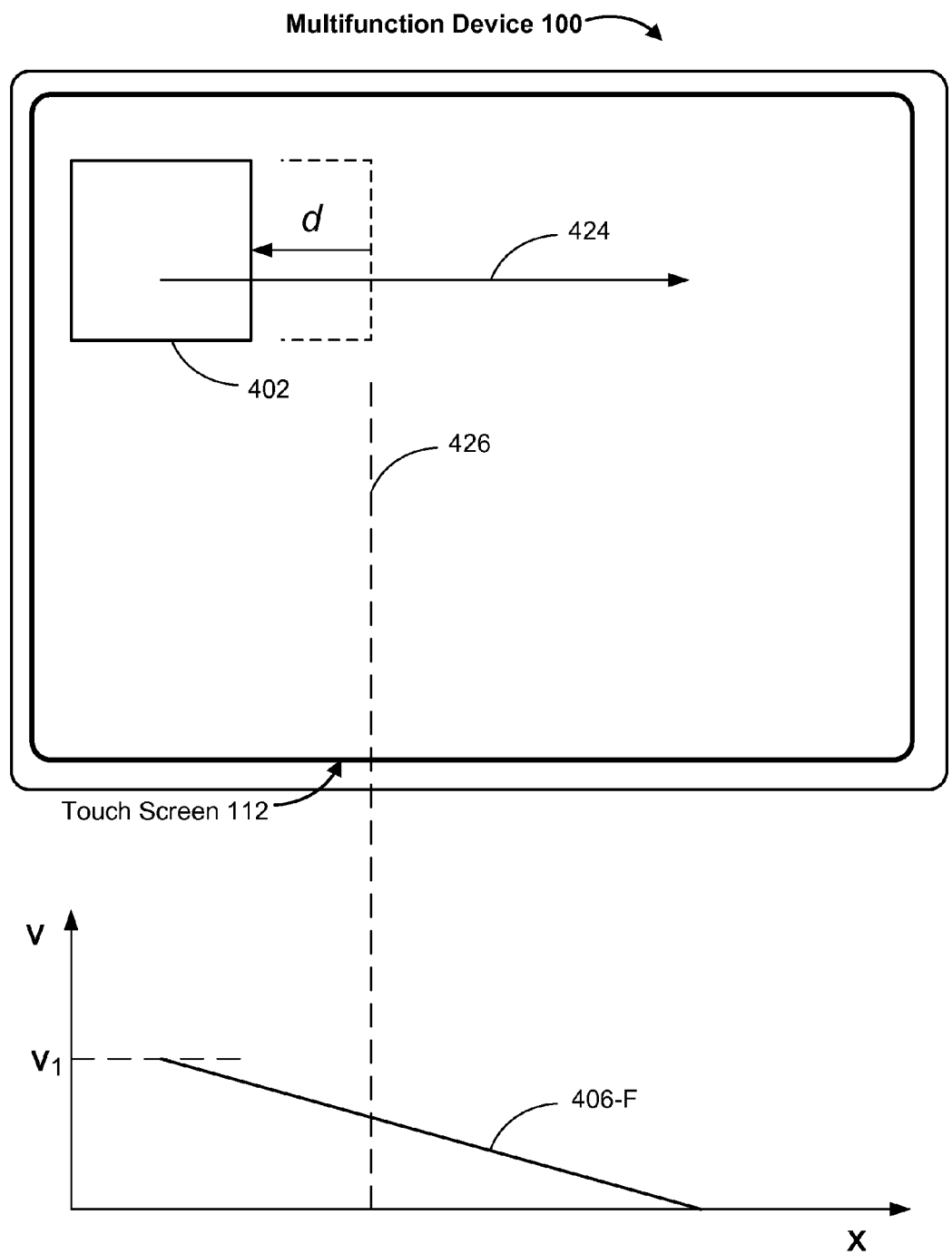

In FIG. 4F, the user interface of device 100 displays an animation of user interface object 402 moving along path 424 in accordance with velocity profile 406-F. Prior to displaying the animation, user interface object 402 moves in accordance with touch inputs. For example, a finger contact on touch screen 112 at a location that corresponds to user interface object 402 moves across touch screen 112, dragging user interface object 402 away from its original position adjacent to line 426 by distance d. In response to detecting a lift-off of the finger contact off touch screen 112, user interface object 402 starts to move at an initial velocity $v_1$ that is determined in accordance with the distance d (e.g., the initial velocity $v_1$ may have a value proportional to the distance d, often up to a predefined maximum velocity), and user interface object 402 decelerates until it stops movement when its velocity becomes zero. In some embodiments, the deceleration rate is selected such that user interface object 402 returns to its original position without overshooting (e.g., the velocity of user interface object 402 reaches zero at the original position of user interface object 402). As used herein with respect to a velocity profile, the term "pull proportional" is characterized by an initial velocity of a pulled user interface object that depends on the distance of the pulled user interface object from its original position. In some embodiments, a function (called a pull proportional function) that sets the initial velocity in accordance with the distance of a user interface object from its original position implements at least a portion of velocity profile 406-F.

Figure 4G:
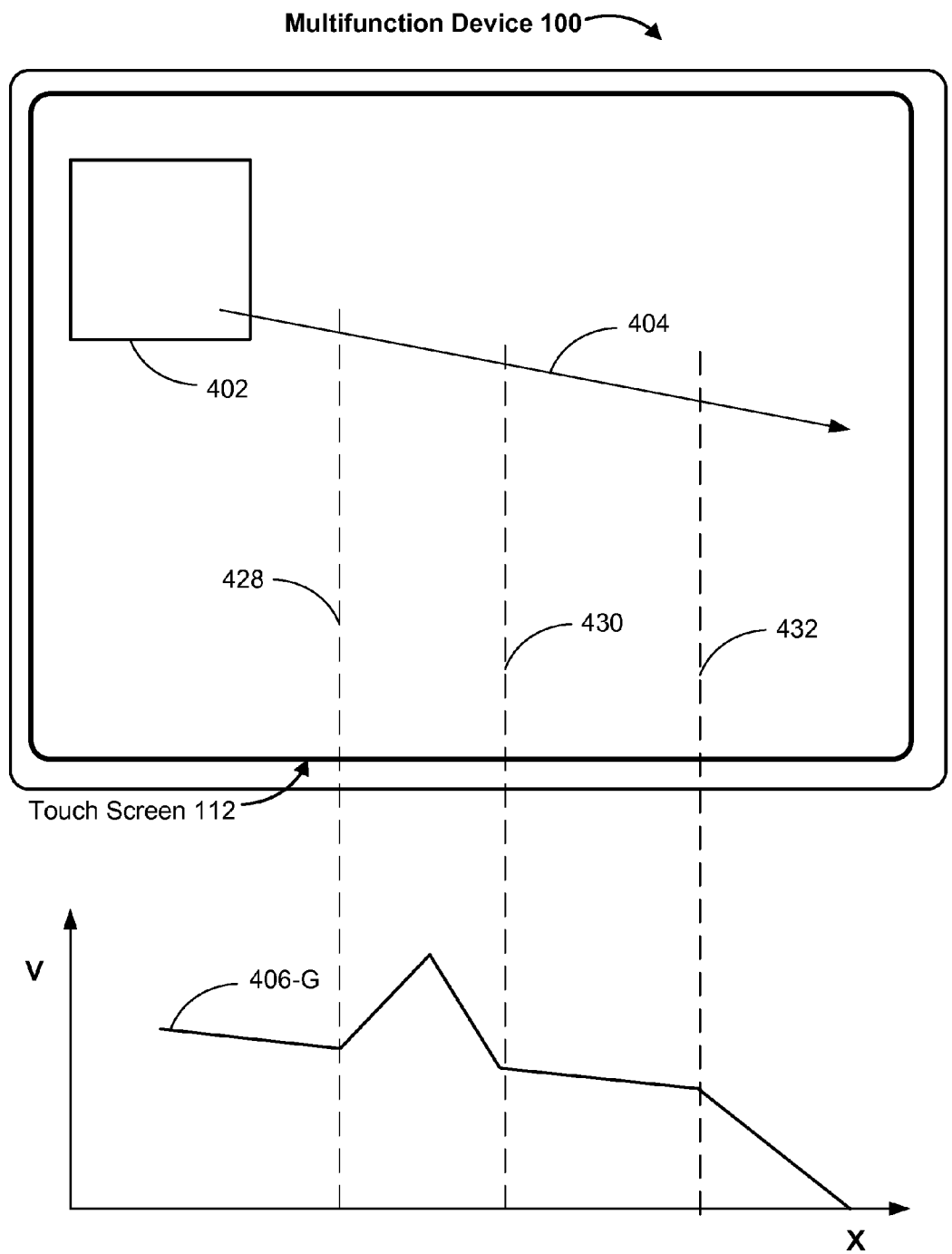

FIG. 4G illustrates a user interface of an application that displays an animation of user interface object 402 moving along path 404 in accordance with velocity profile 406-G. In the animation, user interface object 402 starts to move at an initial velocity and decelerates at a first deceleration rate until user interface object 402 reaches a first location on path 404 corresponding to line 428. Between the first location on path 404 corresponding to line 428 and a second location on path 404 corresponding to line 430, the deceleration rate of user interface object 402 changes in such ways as to create a visual effect of an invisible magnet attracting user interface object 402. Between the second location on path 404 corresponding to line 430 and a third location on path 404 corresponding to line 432, the deceleration rate of user interface object 402 returns to the first deceleration rate. When user interface object 402 reaches the third location on path 404 corresponding to line 432, the deceleration rate of user interface object 402 changes to a second deceleration rate (typically higher than the first deceleration rate so that the velocity of user interface object 402 decreases more rapidly). From the third location on path 404 corresponding to line 432, user interface object 402 continues to move until its velocity reaches zero. In some embodiments, velocity profile 406-G is implemented by using a combination of a simple function, a magnet function, and a soft stop function. In some implementations, the application that includes the user interface object 402 specifies a first range of locations in which the magnet function is operative, and a second range of locations in which the soft stop function is operative.

It should be noted that any deceleration rate described with respect to FIGS. 4A-4G may be a variable deceleration rate. In particular, any deceleration rate of a user interface object described with respect to FIGS. 4A-4G may include a function of time (e.g., the deceleration rate decreases or increases over time) and/or the location of the user interface object (e.g., the deceleration rate decreases or increases as the user interface object moves further away from a reference position, such as its original position).

Although each movement of user interface object 402 in FIGS. 4A-4G has been described with respect to a single velocity profile, in some embodiments, each movement of user interface object 402 may be represented by a plurality of velocity profiles. For example, a diagonal movement of user interface object 402 (e.g., along path 404) may be represented by both a first velocity profile that corresponds to a velocity component along a first axis (e.g., a horizontal axis) and a second velocity profile that corresponds to a velocity component along a second axis (e.g., a vertical axis) that is distinct from the first axis.

FIG. 5 is a flow diagram illustrating method 500 of rendering a user interface with an application service module in accordance with some embodiments. Method 500 is performed at an electronic device (e.g., device 200, FIG. 2, or portable multifunction device 100, FIG. 1A) with a display. The electronic device includes memory that stores one or more programs including one or more applications and an application service module (e.g., 135, FIG. 1A). The application service module is distinct from the one or more applications. In particular, the application service module is configured to provide one or more services to the one or more applications (e.g., handling certain rendering operations for the one or more programs). In some embodiments, the electronic device includes a touch-sensitive surface separate from the display. In some embodiments, the display of the electronic device includes the touch-sensitive surface (i.e., the display is a touch screen display). Some operations in method 500 may be combined and/or the order of some operations may be changed.

In response to receiving a triggering event from a respective application (e.g., image management module 144, FIG. 1A) of the one or more applications, the application service module of the device initializes (502) an animation object with one or more respective initialization values corresponding to the triggering event (e.g., initial velocity, an acceleration/deceleration rate, a type of animation, and animation parameters). In one example, the velocity of the animation object is initialized in accordance with a liftoff velocity of a touch input, and the deceleration rate is initialed to a predefined default value. Exemplary types of animation include: simple, soft stop, hard stop, rebound, pull proportional, and magnet. The animation parameters may include the parameters describing the type of animation. For example, the animation parameters may include a reference location, or a reference range of locations for a soft stop, hard stop, rebound, pull proportional, and magnet. The animation parameters may also include one or more of: rebound parameters (e.g., elasticity), pull proportional parameters (e.g., a coefficient between pull distance d and initial velocity $v_1$, FIG. 4F), and magnet parameters (e.g., attract or repel, and the strength of attraction or repulsion). In some implementations, the animation object comprises an instance of a predefined animation software class. In some embodiments, the predefined animation software class defines members, such as one or more data elements (sometimes called properties or attributes) and one or more methods (sometimes called functions).

At each of a series of successive times (e.g., in accordance with a refresh rate of the display 112, such as 60 Hz or 72 Hz, or at predefined intervals), the application service module of the device updates (504) the animation object so as to produce a respective animation value in accordance with a predefined animation function (e.g., the application service module updates one or more location values, such as horizontal and vertical location values; a rotation value; and/or a scale value). The application service module renders (506) on the display a user interface including one or more user interface objects in accordance with the respective animation value from the animation object. For example, the application service module draws the one or more user interface objects on the user interface in accordance with the respective animation value from the animation object (e.g., using graphics module 132 and/or display controller 156, FIG. 1A) so that the one or more user interface objects are displayed at updated locations, at respective angles corresponding to updated rotation values, and/or with updated scales. In some embodiments, the application service module of the device automatically updates the animation object without any input from the respective application and/or without calling any instruction in the respective application.

In some embodiments, the user interface comprises (508) a user interface of the respective application. In other words, in some embodiments, the application service module renders the user interface of the respective application.

In some embodiments, rendering the user interface includes (510) rendering an animation of the one or more user interface objects in accordance with the respective animation value. For example, the device repeats updating the animation object and rendering the user interface. As the respective animation value produced in accordance with the predefined animation function changes over time, at least one of the one or more user interface objects moves, rotates, and/or changes its size, thereby rendering an animation of the one or more user interface objects.

In some embodiments, the application service module of the device renders (512) the user interface without providing the respective animation value to the respective application. In other words, the application service module directly renders the user interface without involvement of the respective application. As a result, the respective application does not need to handle the rendering of the user interface in accordance with the respective animation value, thereby making the respective application easier to develop and faster to execute.

In some embodiments, the respective application is not configured (516) to receive the respective animation value. As explained above with respect to operation 512, because the respective application does not handle the rendering of the user interface in accordance with the respective animation value, the respective application does not need to receive the respective animation value. By eliminating the instructions for receiving the respective animation value and rendering the user interface in accordance with the respective animation value, the respective application can become more compact to store, easier to develop, and faster to execute.

Alternatively, in some embodiments, at each of the series of successive times, the application service module of the device provides (514) the respective animation value from the animation object to the respective application, which updates a user interface of the respective application in accordance with the respective animation value from the animation object.

In some embodiments, the respective application includes (518) instructions for receiving the respective animation value from the animation object, and for updating the state (e.g., location, rotation angle, scale, transparency, etc.) of the one or more user interface objects. In some embodiments, the respective application includes instructions for rendering the user interface including the one or more user interface objects in accordance with the respective animation value. However, typically, instructions for rendering the user interface are located in the application service module or in another module of the operating system.

Although method 500 has been described above with respect to a single animation object, persons having ordinary skill in the art would recognize that method 500 can be applied to a plurality of animation objects in an analogous manner. For example, in some embodiments, in response to receiving a triggering event from a respective application of the one or more applications, the application service module initializes one or more animation objects, each animation object with one or more respective initialization values corresponding to the triggering event. In one example, the velocity of a respective animation object is initialized in accordance with a liftoff velocity of a touch input. Each animation object comprises an instance of a predefined animation software class. The application service module, at each of a series of successive times: updates each animation object so as to produce a respective animation value in accordance with a predefined animation function; and renders on the display a user interface including one or more user interface objects in accordance with the respective animation value from at least one of the one or more animation objects.

It should be understood that the particular order in which the operations in FIG. 5 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to method 600 (e.g., FIGS. 6A-6B) are also applicable in an analogous manner to method 500 described above with respect to FIG. 5. For example, the predefined animation function described above with reference to method 500 may have one or more of the characteristics of the secondary function described herein with reference to method 600. For brevity, these details are not repeated here.

FIGS. 6A-6B are flow diagrams illustrating method 600 of rendering a user interface based on a state of user interface objects in accordance with some embodiments. Method 600 is performed by (and at) an electronic device (e.g., device 200, FIG. 2, or portable multifunction device 100, FIG. 1A) with a display. In some embodiments, the electronic device includes a touch-sensitive surface separate from the display. In some embodiments, the display of the electronic device includes the touch-sensitive surface (i.e., the display is a touch screen display). Some operations in method 600 may be combined and/or the order of some operations may be changed.

In response to a triggering event, the device initializes (602) an animation object with one or more respective initialization values corresponding to the triggering event. For example, the triggering event may be a software event generated by the one or more programs or a physical event (e.g., a finger contact on the touch-sensitive surface or a lift-off of the finger contact off the touch-sensitive surface). Exemplary types of animation include: simple, soft stop, hard stop, rebound, pull proportional, magnet, and combinations of these types. The animation parameters may include the parameters describing the type of animation. For example, the animation parameters may include a reference location, or a reference range of locations, for a soft stop, hard stop, rebound, pull proportional, and magnet. The animation parameters may also include one or more of: rebound parameters (e.g., elasticity), pull proportional parameters (e.g., a coefficient between pull distance d and initial velocity $v_1$, FIG. 4F), and magnet parameters (e.g., attract or repel, and the strength of attraction or repulsion). The animation parameters may further include a number and type of one or more secondary functions and parameters for the one or more secondary functions. In some implementations, the animation object comprise an instance of a predefined animation software class.

In some embodiments, the electronic device includes (604) a touch-sensitive surface. In some implementations, the triggering event is (or includes) an event corresponding to a lift-off of at least one user-touch (e.g., a finger contact) off the touch-sensitive surface (e.g., 112, FIG. 1A).

At each of a series of successive times (e.g., in accordance with a refresh rate of the display 112, such as 60 Hz or 72 Hz, or at predefined intervals), the device updates (606) the animation object so as to produce a respective animation value in accordance with a predefined animation function. In some implementations, the predefined animation function comprises a combination of a primary function of an initial velocity and a deceleration rate and one or more secondary functions. For example, velocity profile 406-G in FIG. 4G may be implemented by a combination of a simple function, a magnet function, and a soft stop function, where the simple function is the primary function, and the magnet function and the soft stop function are the secondary functions. In some instances, the deceleration rate may include a zero value. In some other implementations, the predefined animation function is a primary function, having an initial velocity and a deceleration rate.

In some embodiments, each secondary function is applicable (608) when the respective animation value falls within a respective corresponding range. For example, in FIG. 4G, the magnet function is applicable when distance x corresponding to the respective animation value falls between a location on path 404 corresponding to line 428 and a location on path 404 corresponding to line 430. The soft stop function is applicable when distance x corresponding to the respective animation value matches or exceeds the value of a location on path 404 corresponding to line 432.

In some embodiments, a respective secondary function corresponds (610) to one of: a soft stop function (e.g., velocity profile 406-C, FIG. 4C), a hard stop function (e.g., velocity profile 406-B, FIG. 4B), a rebound function (e.g., velocity profile 406-D, FIG. 4D), a pull proportional function (e.g., velocity profile 406-F, FIG. 4F), and a magnet function (e.g., velocity profile 406-E, FIG. 4E).

In some embodiments, the animation function comprises (612) a combination of the primary function and two or more secondary functions. Each secondary function corresponds to a distinct one of: a soft stop function, a rebound function, a pull proportional function, and a magnet function. For example, velocity profile 406-G in FIG. 4G may be implemented by using the two distinct secondary functions: a magnet function and a soft stop function.

In some embodiments, the respective animation value produced by the animation object is (614) a one-dimensional scalar value (e.g., in FIGS. 4A-4G, the respective animation value corresponds to a scalar value, x). In some embodiments, the respective animation value produced by the animation object is a tuple (i.e., a set of values). For example, the respective animation value may include a tuple of a horizontal position value and a vertical position value, which may be expressed as (m, n), where m is a horizontal position value and n is a vertical position value. In some instances, the respective animation value includes two or more of: a horizontal position value, a vertical position value, a rotation value (e.g., a rotation angle), a scale value, a transparency value, and an audio volume value. However, in other embodiments, each animation object generates only a single animation value; when more than one parameter (e.g., two or more of a horizontal position value, a vertical position value, a rotation value, a scale value, a transparency value, and an audio volume value) of a respective user interface object is to be animated, each parameter is controlled by the animation value generated by a distinct animation object.

The device updates (616) a state of one or more user interface objects. Each updated user interface object is updated in accordance with the respective animation value from the animation object. For example, the position value and/or rotation value of one or more user interface objects may be updated in accordance with the respective animation value.

The device renders (618) on the display a user interface in accordance with the updated state of the one or more user interface objects. For example, the device constructs user interface data, and displays the user interface using graphics module 132 and/or display controller 156 (FIG. 1A).

In some embodiments, rendering the user interface in accordance with the updated state of the one or more user interface objects includes (620) updating a parameter, other than a position or movement parameter, of at least one of the one or more user interface objects in accordance with the updated state of at least one of the one or more user interface objects. For example, in some embodiments, rendering the user interface in accordance with the updated state of the one or more user interface objects includes (622) updating a transparency of at least one of the one or more user interface objects in accordance with the updated state of at least one of the one or more user interface objects.

In some embodiments, a respective secondary function is modified (624) during the series of successive times (e.g., from a soft stop function to a hard stop function, or from a soft stop function to a rebound function). For example, in response to a second triggering condition (e.g., a user input, expiration of a timer, or other event), the application modifies a parameter of the secondary function, modifies the applicable range in which the secondary function operates, replaces the secondary function with another secondary function, or removes the secondary function from the animation function.

In some embodiments, the device repeats: updating the animation object, updating the state of one or more user interface objects, and rendering the user interface until the respective animation value corresponds to a respective final value (626). In some embodiments, the respective final value is predetermined (e.g., a value corresponding to the final destination of one or more respective user interface objects). In some embodiments, the respective final value is dynamically determined. For example, the location of the user interface object where the velocity of the user interface object reaches zero may be selected as the respective final value. Alternatively, the device iterates: updating the animation object, updating the state of one or more user interface objects, and rendering the user interface for a predefined number of cycles (e.g., 600 cycles) or a predefined duration (e.g., 10 seconds).

As noted above with respect to operation 620, in some embodiments, the device adjusts (628) a user interface object parameter other than a position or movement parameter in accordance with the respective animation value from the animation object. For example, the device may update a scale (e.g., size) of at least one of the one or more user interface objects. In some instances, the device may update a color of at least one of the one or more user interface objects.

In some embodiments, the electronic device includes (630) one or more speakers. The device adjusts a volume of at least one of the one or more speakers in accordance with the respective animation value from the animation object.

Although the operations in FIGS. 6A-6B have been described as performed by the electronic device, it should be appreciated that in some embodiments, the device includes an application service module (e.g., 135, FIG. 1A) and the application service module of the device performs applicable operations in FIGS. 6A-6B.

In addition, although method 600 has been described above with respect to a single animation object, persons having ordinary skill in the art would recognize that method 600 can be applied to a plurality of animation objects in an analogous manner.

Furthermore, it should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to method 500 (e.g., FIG. 5) are also applicable in an analogous manner to method 600 described above with respect to FIGS. 6A-6B. For example, the electronic device described above with reference to method 600 may have one or more of the characteristics of the application service module described herein with reference to method 500. For brevity, these details are not repeated here.

The operations in the methods described above may be implemented by running one or more functional modules in information processing apparatus such as general purpose processors or application specific chips. These modules, combinations of these modules, and/or their combination with general hardware (e.g., as described above with respect to FIGS. 1A and 2) are all included within the scope of the claims.

The operations described above with reference to FIGS. 5 and 6A-6B may be implemented by components depicted in FIGS. 1A-1B and 2. For example, receiving and initializing operation 502, updating operation 504, and rendering operation 506 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a detected event corresponds to a predefined event or sub-event, such as dragging of a user interface object and a release of the user interface object. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B and 2.

Figure 7:
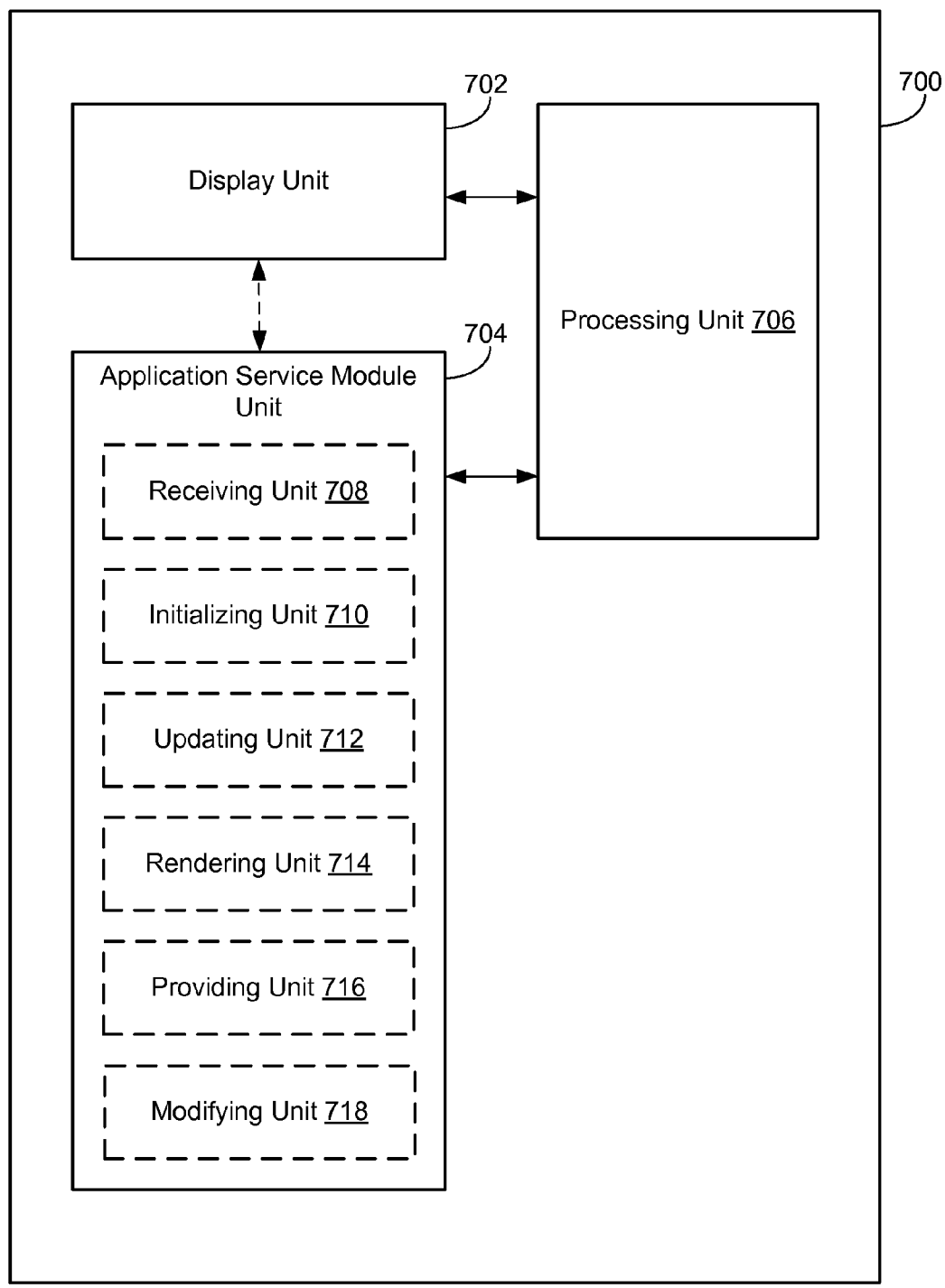
FIG. 7 is a functional block diagram of an electronic device in accordance with some embodiments.

In accordance with some embodiments, FIG. 7 shows a functional block diagram of an electronic device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, the electronic device 700 includes a display unit 702, a processing unit 706 coupled to the display unit 702, and an application service module unit 704 coupled to the processing unit 706. In some embodiments, the application service module unit 704 is also coupled to the display unit 702. In some embodiments, the application service module unit 704 includes a receiving unit 708, an initializing unit 710, an updating unit 712, a rendering unit 714, a providing unit 716, and a modifying unit 718. The application service module unit 704 is configured to, in response to receiving a triggering event from a respective application (e.g., with the receiving unit 708), initialize an animation object with one or more respective initialization values corresponding to the triggering event (e.g., with the initializing unit 710). The animation object includes an instance of a predefined animation software class. The application service module unit 704 is also configured to, at each of a series of successive times: update the animation object so as to produce a respective animation value in accordance with a predefined animation function (e.g., with the updating unit 712), and render on the display unit 702 a user interface including one or more user interface objects in accordance with the respective animation value from the animation object (e.g., with the rendering unit 714).

In some embodiments, the user interface includes a user interface of the respective application.

In some embodiments, the application service module unit 704 is configured to render an animation of the one or more user interface objects in accordance with the respective animation value (e.g., with the rendering unit 714).

In some embodiments, the application service module unit 704 is configured to render the user interface without providing the respective animation value to the respective application.

In some embodiments, the respective application is not configured to receive the respective animation value.

In some embodiments, the application service module unit 704 is configured to, at each of the series of successive times, provide (e.g., with the providing unit 716) the respective animation value from the animation object to the respective application, which updates a user interface of the respective application in accordance with the respective animation value from the animation object.

In some embodiments, the respective application includes instructions for receiving the animation value from the animation object and updating a state of the one or more user interface objects in accordance with the received animation value.

In some embodiments, the predefined animation function includes a combination of a primary function of an initial velocity and a deceleration rate and one or more secondary functions.

In some embodiments, each secondary function is applicable when the respective animation value falls within a respective corresponding range.

In some embodiments, a respective secondary function corresponds to one of: a soft stop function, a hard stop function, a rebound function, a pull proportional function, and a magnet function.

In some embodiments, the animation function includes a combination of the primary function and two or more secondary functions. Each secondary function corresponds to a distinct one of: a soft stop function, a rebound function, a pull proportional function, and a magnet function.

In some embodiments, a respective secondary function is modified during the series of successive times (e.g., with the modifying unit 718).

Figure 8:
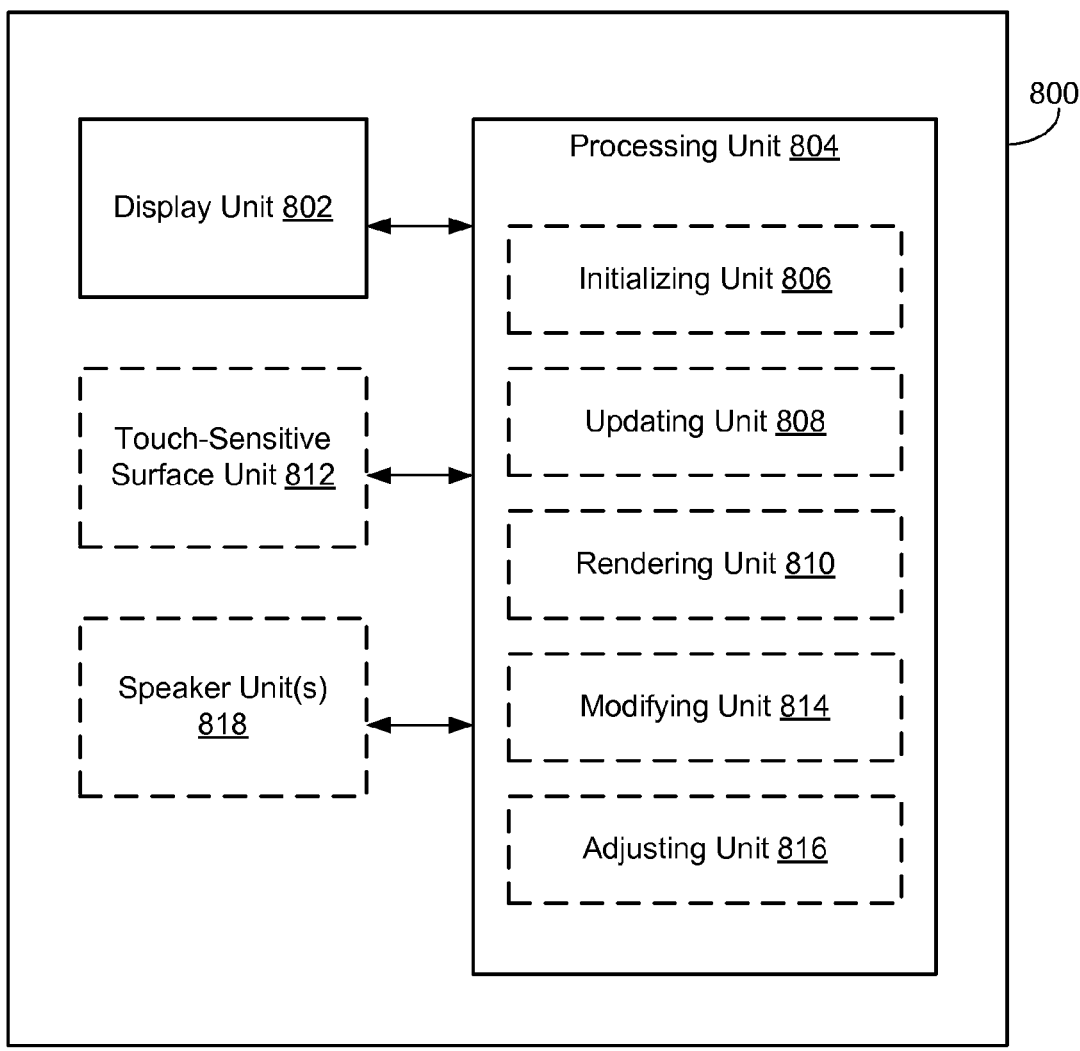
FIG. 8 is a functional block diagram of an electronic device in accordance with some embodiments.

In accordance with some embodiments, FIG. 8 shows a functional block diagram of an electronic device 800 configured in accordance with the principles of the invention as described above. The functional blocks of the device may be implemented by hardware, software, or a combination of hardware and software to carry out the principles of the invention. It is understood by persons of skill in the art that the functional blocks described in FIG. 8 may be combined or separated into sub-blocks to implement the principles of the invention as described above. Therefore, the description herein may support any possible combination or separation or further definition of the functional blocks described herein.

As shown in FIG. 8, an electronic device 800 includes a display unit 802 and a processing unit 804 coupled to the display unit 802. In some embodiments, the processing unit 804 includes an initializing unit 806, an updating unit 808, a rendering unit 810, a modifying unit 814, and an adjusting unit 816. The processing unit 804 is configured to, in response to a triggering event, initialize an animation object with one or more respective initialization values corresponding to the triggering event (e.g., with the initializing unit 806). The animation object includes an instance of a predefined animation software class. The processing unit 804 is also configured to: at each of a series of successive times, update the animation object so as to produce a respective animation value in accordance with a predefined animation function (e.g., with the updating unit 808), update a state of one or more user interface objects (e.g., with the updating unit 808), and render on the display a user interface in accordance with the updated state of the one or more user interface objects (e.g., with the rendering unit 810). The predefined animation function includes a combination of a primary function of an initial velocity and a deceleration rate and one or more secondary functions. Each updated user interface object is updated (e.g., with the updating unit 808) in accordance with the respective animation value from the animation object.

In some embodiments, each secondary function is applicable when the respective animation value falls within a respective corresponding range.

In some embodiments, a respective secondary function corresponds to one of: a soft stop function, a hard stop function, a rebound function, a pull proportional function, and a magnet function.

In some embodiments, the animation function includes a combination of the primary function and two or more secondary functions. Each secondary function corresponds to a distinct one of: a soft stop function, a rebound function, a pull proportional function, and a magnet function.

In some embodiments, a respective secondary function is modified during the series of successive times (e.g., with the modifying unit 814).

In some embodiments, the processing unit 804 is configured to repeat: updating the animation object (e.g., with the updating unit 808), updating the state of one or more user interface objects (e.g., with the updating unit 808), and rendering the user interface until the respective animation value corresponds to a respective final value (e.g., with the rendering unit 810).

In some embodiments, the respective animation value produced by the animation object is a one-dimensional scalar value.

In some embodiments, the electronic device 800 includes a touch-sensitive surface unit 812 coupled to the processing unit 804, and the triggering event includes an event corresponding to a lift-off of at least one user-touch off the touch-sensitive surface unit 812.

In some embodiments, the processing unit 804 is configured to update a parameter, other than a position or movement parameter, of at least one of the one or more user interface objects in accordance with the updated state of at least one of the one or more user interface objects (e.g., with the updating unit 808).

In some embodiments, the processing unit 804 is configured to update a transparency of at least one of the one or more user interface objects in accordance with the updated state of at least one of the one or more user interface objects (e.g., with the updating unit 808).

In some embodiments, the processing unit 804 is configured to adjust a user interface object parameter other than a position or movement parameter in accordance with the respective animation value from the animation object (e.g., with the adjusting unit 816).

In some embodiments, the electronic device 800 includes one or more speaker units 818 coupled to the processing unit 804, and the processing unit 804 is configured to adjust a volume of at least one of the one or more speaker units 818 in accordance with the respective animation value from the animation object (e.g., with the adjusting unit 816).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method performed by an electronic device having a display, a touch-sensitive surface, one or more processors and memory storing one or more programs for execution by the one or more processors, the method comprising:
   detecting a first triggering event in a first application, wherein the first triggering event corresponds to gestural input of a first contact on the touch-sensitive surface while a user interface of the first application is displayed on the display;
   in response to detecting the first triggering event:
      generating a first set of one or more initialization values corresponding to the gestural input of the first contact;
      generating a first animation in the first application based on the first set of one or more initialization values corresponding to the gestural input of the first contact and a predefined animation function, wherein the predefined animation function is defined independently of the first application and generating the animation includes, at each of a series of successive times, updating a state of one or more user interface objects in the user interface of the first application in accordance with the first set of one or more initialization values and the predefined animation function that is defined independently of the first application; and
   after generating the first animation, detecting a second triggering event in a second application that is different from the first application, wherein the second triggering event corresponds to gestural input of a second contact on the touch-sensitive surface while a user interface of the second application is displayed on the display; and
   in response to detecting the second triggering event:
      generating a second set of one or more initialization values corresponding to the gestural input of the second contact; and
      generating a second animation in the second application based on the second set of one or more initialization values corresponding to the gestural input of the second contact and the predefined animation function, wherein the predefined animation function is defined independently of the second application and generating the animation includes, at each of a series of successive times, updating a state of one or more user interface objects in the user interface of the second application in accordance with the second set of one or more initialization values and the predefined animation function that is defined independently of the second application.

2. The method of claim 1, wherein the predefined animation function includes a secondary function corresponding to one of:
   a soft stop function,
   a hard stop function,
   a rebound function,
   a pull proportional function, and
   a magnet function.

3. The method of claim 2, wherein the secondary function is applicable when one of the one or more initialization values falls within a corresponding range.

4. The method of claim 2, wherein the predefined animation function includes a combination of a primary function and the secondary function.

5. The method of claim 4, wherein the secondary function is modified during the series of successive times for one or both of the first application or the second application.

6. The method of claim 1, further comprising repeating updating the state of one or more user interface objects in the user interface of one or both of the first application or the second application until a respective initialization value from the first set or second set of one or more initialization values corresponds to a respective final value.

7. The method of claim 1, wherein
   one or both of the first triggering event or the second triggering event include an event corresponding to a lift-off of at least one user-touch off the touch-sensitive surface.

8. The method of claim 1, wherein updating the state of one or more user interface objects in the user interface of one or both of the first application or the second application includes updating a parameter, other than a position or movement parameter, of at least one of the one or more user interface objects of one or both of the first application or the second application in accordance with the updated state of at least one of the one or more user interface objects of one or both of the first application or the second application.

9. The method of claim 1, wherein updating the state of one or more user interface objects in the user interface of one or both of the first application or the second application includes updating a transparency of at least one of the one or more user interface objects of one or both of the first application or the second application in accordance with the updated state of at least one of the one or more user interface objects of one or both of the first application or the second application.

10. The method of claim 9, further comprising:
   adjusting a user interface object parameter other than a position or movement parameter in accordance with an initialization value from one of the first set or second set of one or more initialization values.

11. The method of claim 1, wherein:
   the electronic device includes one or more speakers; and
   the method further comprises adjusting a volume of at least one of the one or more speakers in accordance with an initialization value from one of the first set or second set of one or more initialization values.

12. An electronic device, comprising:
   a display;
   one or more processors; and
   memory storing one or more programs for execution by the one or more processors, the one or more programs including instructions for:
      detecting a first triggering event in a first application, wherein the first triggering event corresponds to gestural input of a first contact on the touch-sensitive surface while a user interface of the first application is displayed on the display;

in response to detecting the first triggering event:

generating a first set of one or more initialization values corresponding to the gestural input of the first contact;

generating a first animation in the first application based on the first set of one or more initialization values corresponding to the gestural input of the first contact and a predefined animation function, wherein the predefined animation function is defined independently of the first application and generating the animation includes, at each of a series of successive times, updating a state of one or more user interface objects in the user interface of the first application in accordance with the first set of one or more initialization values and the predefined animation function that is defined independently of the first application; and after generating the first animation, detecting a second triggering event in a second application that is different from the first application, wherein the second triggering event corresponds to gestural input of a second contact on the touch-sensitive surface while a user interface of the second application is displayed on the display; and in response to detecting the second triggering event:

generating a second set of one or more initialization values corresponding to the gestural input of the second contact; and generating a second animation in the second application based on the second set of one or more initialization values corresponding to the gestural input of the second contact and the predefined animation function, wherein the predefined animation function is defined independently of the second application and generating the animation includes, at each of a series of successive times, updating a state of one or more user interface objects in the user interface of the second application in accordance with the second set of one or more initialization values and the predefined animation function that is defined independently of the second application.

13. The device of claim 12, wherein the predefined animation function includes a secondary function corresponding to one of:

a soft stop function,
a hard stop function,
a rebound function,
a pull proportional function, and
a magnet function.

14. The device of claim 13, wherein the secondary function is applicable when one of the one or more initialization values falls within a corresponding range.

15. The device of claim 13, wherein the predefined animation function includes a combination of a primary function and the secondary function.

16. The device of claim 15, wherein the secondary function is modified during the series of successive times for one or both of the first application or the second application.

17. The device of claim 12, wherein updating the state of one or more user interface objects in the user interface of one or both of the first application or the second application include instructions for updating a transparency of at least one of the one or more user interface objects of one or both of the first application or the second application in accordance with the updated state of at least one of the one or more user interface objects of one or both of the first application or the second application.

18. The device of claim 12, wherein:

the electronic device includes one or more speakers; and the method further comprises adjusting a volume of at least one of the one or more speakers in accordance with an initialization value from one of the first set or second set of one or more initialization values.

19. A non-transitory computer readable storage medium, storing one or more programs for execution by one or more processors of an electronic device with a display, the one or more programs including instructions for:

detecting a first triggering event in a first application, wherein the first triggering event corresponds to gestural input of a first contact on the touch-sensitive surface while a user interface of the first application is displayed on the display;

in response to detecting the first triggering event:

generating a first set of one or more initialization values corresponding to the gestural input of the first contact;

generating a first animation in the first application based on the first set of one or more initialization values corresponding to the gestural input of the first contact and a predefined animation function, wherein the predefined animation function is defined independently of the first application and generating the animation includes, at each of a series of successive times, updating a state of one or more user interface objects in the user interface of the first application in accordance with the first set of one or more initialization values and the predefined animation function that is defined independently of the first application; and after generating the first animation, detecting a second triggering event in a second application that is different from the first application, wherein the second triggering event corresponds to gestural input of a second contact on the touch-sensitive surface while a user interface of the second application is displayed on the display; and in response to detecting the second triggering event:

generating a second set of one or more initialization values corresponding to the gestural input of the second contact; and generating a second animation in the second application based on the second set of one or more initialization values corresponding to the gestural input of the second contact and the predefined animation function, wherein the predefined animation function is defined independently of the second application and generating the animation includes, at each of a series of successive times, updating a state of one or more user interface objects in the user interface of the second application in accordance with the second set of one or more initialization values and the predefined animation function that is defined independently of the second application.

20. The computer readable storage medium of claim 19, wherein the predefined animation function includes a secondary function corresponding to one of:

a soft stop function,
a hard stop function,
a rebound function,
a pull proportional function, and
a magnet function.

21. The computer readable storage medium of claim 20, wherein the secondary function is applicable when one of the one or more initialization values falls within a corresponding range.

22. The computer readable storage medium of claim 20, wherein the predefined animation function includes a combination of a primary function and the secondary function.

23. The computer readable storage medium of claim 22, wherein the secondary function is modified during the series of successive times for one or both of the first application or the second application.

24. The computer readable storage medium of claim 19, wherein updating the state of one or more user interface objects in the user interface of one or both of the first application or the second application include instructions for updating a transparency of at least one of the one or more user interface objects of one or both of the first application or the second application in accordance with the updated state of at least one of the one or more user interface objects of one or both of the first application or the second application.

25. The computer readable storage medium of claim 19, wherein:

the electronic device includes one or more speakers; and
the method further comprises adjusting a volume of at least one of the one or more speakers in accordance with an initialization value from one of the first set or second set of one or more initialization values.

* * * * *